US010330920B2

(12) United States Patent
Brown et al.

(10) Patent No.: US 10,330,920 B2
(45) Date of Patent: Jun. 25, 2019

(54) DROPLET ACTUATION METHOD FOR A MICROFLUIDIC DEVICE

(71) Applicant: Sharp Microfluidic Solutions Limited, Oxford (GB)

(72) Inventors: Christopher James Brown, Oxford (GB); Benjamin James Hadwen, Oxford (GB); Pamela Ann Dothie, Oxford (GB)

(73) Assignee: Sharp Life Science (EU) Limited, Oxford (GB)

( * ) Notice: Subject to any disclaimer, the term of this patent is extended or adjusted under 35 U.S.C. 154(b) by 86 days.

(21) Appl. No.: 15/478,752

(22) Filed: Apr. 4, 2017

(65) Prior Publication Data

US 2018/0284424 A1    Oct. 4, 2018

(51) Int. Cl.
*G02B 26/00* (2006.01)
*B01L 3/00* (2006.01)

(52) U.S. Cl.
CPC ...... *G02B 26/005* (2013.01); *B01L 3/502792* (2013.01); *B01L 3/50273* (2013.01); *B01L 2300/089* (2013.01); *B01L 2300/0816* (2013.01); *B01L 2400/0427* (2013.01)

(58) Field of Classification Search
None
See application file for complete search history.

(56) References Cited

U.S. PATENT DOCUMENTS

| | | | |
|---|---|---|---|
| 6,565,727 B1 | 5/2003 | Shenderov | |
| 6,911,132 B2 | 6/2005 | Pamula et al. | |
| 7,163,612 B2 | 1/2007 | Sterling et al. | |
| 8,173,000 B1 | 5/2012 | Hadwen et al. | |
| 8,653,832 B2 | 2/2014 | Hadwen et al. | |
| 8,815,070 B2 | 8/2014 | Wang et al. | |
| 2011/0220505 A1 | 9/2011 | Wang et al. | |
| 2012/0006684 A1 | 1/2012 | Hadwen et al. | |
| 2012/0024708 A1 | 2/2012 | Chiou et al. | |

FOREIGN PATENT DOCUMENTS

EP    2614892    7/2013

OTHER PUBLICATIONS

Hadwen et al.: "Programmable large area digital microfluidic array with integrated droplet sensing for bioassays", Lab on a Chip, vol. 12, No. 18, pp. 3305-3313, May 25, 2012.

*Primary Examiner* — Darryl J Collins
*Assistant Examiner* — Journey F Sumlar
(74) *Attorney, Agent, or Firm* — Renner, Otto, Boisselle & Sklar, LLP

(57) ABSTRACT

A microfluidic system includes an electrowetting on dielectric (EWOD) device comprising an array of elements that are actuatable for manipulation of a liquid droplet within the EWOD device. The system has a pattern generator that generates an actuation pattern for actuating a portion of the elements in the array of elements, and a signal generator that generates voltage signals for actuating elements in the array of elements in accordance with the actuation pattern. The pattern generator generates an actuation pattern in which voltage signals applied to elements in at least part of a region at or adjacent to a contact line of the droplet are different from voltage signals applied to elements that are not in the part of the region at or adjacent to the contact line. The system further may include a sensor for sensing the droplet contact line constituting a boundary of the liquid droplet.

24 Claims, 19 Drawing Sheets

FIG 1: PRIOR ART $$\Delta V_{HC2} = V_{LD} - V_{E2}$$

$$V_{LD} = V_0 + \frac{\sum_n (C_{HC2} \Delta V_{E2} + C_{EL} \Delta V_{E1(n)})}{C_{TOTAL}}$$

$$\frac{1}{C_{EL}} = \frac{1}{C_{HC1}} + \frac{1}{C_{INS}}$$

$$C_{TOTAL} = n \cdot (C_{EL} + C_{HC2})$$

FIG 5

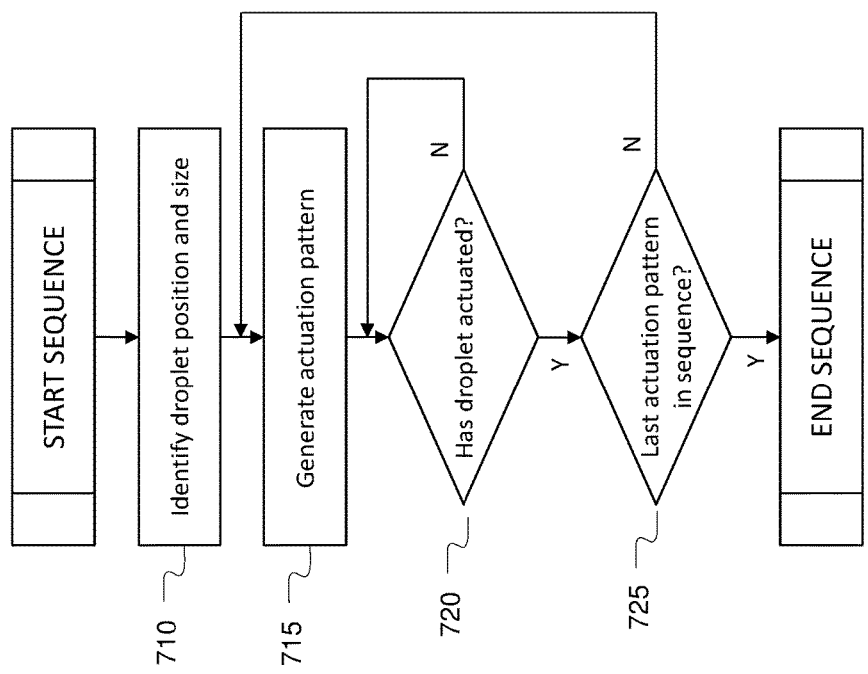

1060

$$V_{LD} = V_0 + \frac{\sum_n (C_{EL} \Delta V_{E1(n)})}{C_{TOTAL}}$$

$$\frac{1}{C_{EL}} = \frac{1}{C_{HC1}} + \frac{1}{C_{INS}}$$

$$C_{TOTAL} = n \cdot C_{EL}$$

FIG 15

DROPLET ACTUATION METHOD FOR A MICROFLUIDIC DEVICE

TECHNICAL FIELD

The present invention is related to methods for actuating droplets within microfluidic devices, more specifically within active matrix electro wetting on dielectric (AM-EWOD) digital microfluidic devices.

BACKGROUND ART

Electro-wetting on dielectric (EWOD) is a well-known technique for manipulating droplets of fluid by application of an electric field. The structure of a conventional EWOD device is illustrated in the cross section diagram of FIG. 1. As shown, the EWOD device includes a lower substrate 30 and an upper substrate 36 arranged opposite the lower substrate 30 and separated from it by a spacer 32 to form a fluid gap 35.

A conductive material is formed on the lower substrate 30 and patterned to form a plurality of individually addressable lower electrodes 38, as depicted in FIG. 1 for example as a first lower electrode 38A and a second lower electrode 38B. An insulator layer 20 is formed on the lower substrate 30 over the lower electrodes 38 and a lower hydrophobic coating 16 is formed over the insulator layer. The hydrophobic coating is formed from a hydrophobic material. The hydrophobic material is commonly, but not necessarily, a fluoropolymer. A conductive material is formed on the upper substrate 36 and acts as a common reference electrode 28. An upper hydrophobic coating 26 is formed over the common reference electrode 28. The fluid gap is filled with a non-polar filler fluid 34, such as oil, and liquid droplets 4. The liquid droplet 4, commonly an aqueous and/or ionic fluid, includes a polar material and is in contact with both the lower hydrophobic coating 16 and the upper hydrophobic coating 26. The interface between the liquid droplet 4 and filler fluid 34 forms a contact angle θ 6 with the surface of the lower hydrophobic coating 16.

In operation, voltage signals are applied to the lower electrodes 38 and common reference electrode 28 so as to actuate the liquid droplet 4 to move within the fluid gap 35 by the EWOD technique. Typically, the lower electrodes 38 are patterned to form an array, or matrix, with each element of the array comprising a single individually addressable lower electrode 38. A plurality of droplets may therefore be controlled to move independently within the fluid gap 35 of the EWOD device.

U.S. Pat. No. 6,565,727 (Shenderov, issued May 20, 2003) discloses an EWOD device with a passive type array for moving droplets.

U.S. Pat. No. 6,911,132 (Pamula et al., issued Jun. 28, 2005) discloses an EWOD device with a two dimensional array to control the position and movement of droplets in two dimensions.

U.S. Pat. No. 8,815,070 (Wang et al., issued Aug. 26, 2014) describes an EWOD device in which multiple microelectrodes are used to control the position and movement of a droplet.

U.S. Pat. No. 8,173,000 (Hadwen et al, issued May 8, 2012) discloses an EWOD device with improved reliability by means of application of an AC voltage signal to the common reference electrode.

Active Matrix EWOD (AM-EWOD) refers to implementation of EWOD in an active matrix array incorporating transistors within each element of the array. The transistors may be, for example, thin film transistors (TFTs), and form an electronic circuit within each array element to control the voltage signals applied to the lower electrodes.

U.S. Pat. No. 7,163,612 (Sterling et al., issued Jan. 16, 2007) describes how TFT based thin film electronics may be used to control the addressing of voltage pulses to an EWOD array by using circuit arrangements very similar to those employed in active matrix display technologies.

U.S. Pat. No. 8,653,832 (Hadwen et al, issued Feb. 18, 2014) discloses an AM-EWOD device in which each element in the array includes circuitry to both control the voltage signals applied to the lower electrode and to sense the presence of a liquid droplet above the electrode.

A disadvantage of the conventional EWOD device structure as described above is the presence of an electric field across the upper hydrophobic coating 26. The hydrophobic coating is necessary for successful application of the EWOD technique but acts as an insulating material thus separating the common reference electrode 28 from electrical contact with the liquid droplet 4. Accordingly, the electric potential of the liquid droplet 4 may assume a different value from that applied to the common reference electrode 28. This potential difference and the resulting electric field present across the upper hydrophobic coating has been observed as a source of deleterious effects including reduction of the electrowetting force, the generation of bubbles in the filler fluid and degradation of chemicals or biological materials within the droplet. A method to reduce the electric field within the upper hydrophobic coating is therefore sought.

SUMMARY OF INVENTION

According to the present invention, a method of actuating droplets in an electro-wetting on dielectric (EWOD) type microfluidic device is provided in which the electric field across an upper hydrophobic coating layer is reduced.

An EWOD microfluidic device includes an array, each element of which includes an electrode to which a voltage may be applied to cause actuation of droplets by the electrowetting on dielectric technique. Droplets within the EWOD microfluidic device may occupy an area larger than the area of a single element and covering a plurality of elements.

The droplet actuation method of the present invention involves application of actuation patterns comprising both actuated and unactuated elements. Actuated elements are those to which an actuation voltage signal is applied. Unactuated elements are those to which an actuation voltage signal is not applied, i.e. the applied voltage signal is less than the electrowetting threshold voltage or the element electrode is electrically isolated or floating. The voltage of the droplet is thus controlled such that droplet actuation may still occur and such that the potential difference between the droplet and a common reference electrode is reduced.

The droplet actuation method of the present invention has been found to improve the operation of the device by minimizing the impact of deleterious effects such as reduction of electrowetting force, generation of bubbles and degradation of chemical and biological materials within the droplet.

The invention provides for an enhanced microfluidic system and related control methods. In exemplary embodiments, the microfluidic system includes an electrowetting on dielectric (EWOD) device having an array of elements that are actuatable for manipulation of a liquid droplet within the EWOD device. The microfluidic system further may include a pattern generator that is configured to generate an actuation pattern for actuating a portion of the elements in the array of elements, and a signal generator that generates voltage signals for actuating elements in the array of elements in accordance with the actuation pattern. The pattern generator is configured to generate an actuation pattern in a region of the array of elements containing the liquid droplet, the actuation pattern including a first voltage signal that is applied to elements in a part of the region at or adjacent to a contact line of the liquid droplet with the array of elements, and a second voltage signal is applied to elements in a part of the region that is not at or adjacent to the contact line, and that the first and second voltage signals are different. The system further may include a droplet position detector that tracks a position of the droplet within the EWOD device for determining the contact line constituting a boundary of the liquid droplet.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

In the annexed drawings, like references indicate like parts or features:

FIG. 5 shows a set of equations describing a droplet actuation method.

FIG. 7 shows a flowchart of a fluid operation and droplet actuation method in accordance with the present invention.

FIG. 15 shows a set of equations describing the droplet actuation method used in conjunction with the EWOD device structure of FIG. 14.

DESCRIPTION OF REFERENCE NUMERALS

Figure 1:
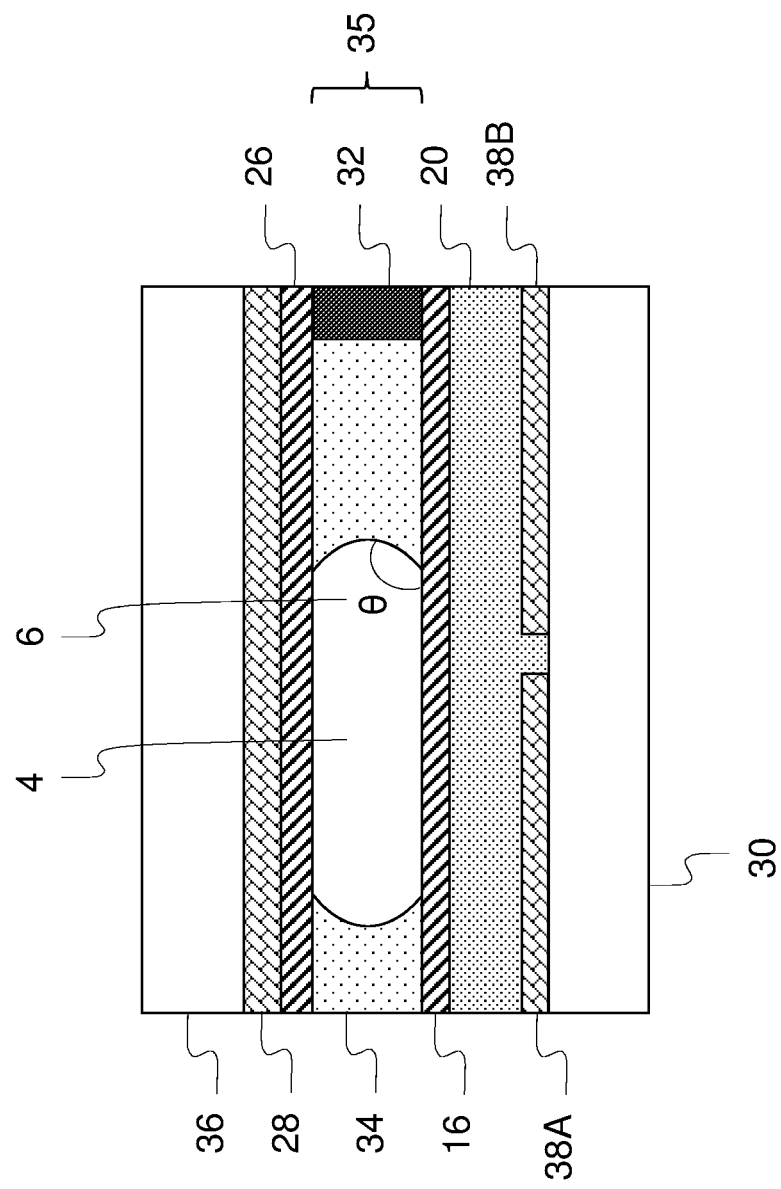
FIG. 1 shows prior art: a schematic cross-sectional diagram depicting a conventional EWOD device.

4 Liquid droplet
6 Contact angle, θ
16 Lower hydrophobic coating
20 Insulator layer
26 Upper hydrophobic coating
28 Common reference electrode
30 Lower substrate
32 Spacer
34 Non-polar fluid
35 Fluid gap
36 Upper substrate
38 Lower electrodes
38A First lower electrode
38B Second lower electrode
200 EWOD device
204 Liquid droplet
216 First hydrophobic coating layer
220 Insulator layer
226 Second hydrophobic coating layer
228 Common reference electrode
230 First substrate
232 Spacer
234 Filler fluid
235 Fluid gap
236 Second substrate
238 Set of element electrodes
239 Element electrode
290 Array of elements
292A-292F Elements of array
310 Hardware controller
312 Signal generator unit
314 Droplet position detector
320 Processing unit
322 Pattern generator unit
324 Data analysis unit
326 Memory unit
328 Operator scheduler
405 Resistor $R_{E2}$
410 Capacitor $C_{HC2}$
415 Resistor $R_{FF}$
417 Resistor $R_{LD}$
420 Capacitor $C_{FF}$
422 Capacitor $C_{LD}$
425 Capacitor $C_{HC1}$
430 Capacitor $C_{INS}$
435 Resistor $R_{E1}$
600 Array of elements
605 Actuation pattern
610 Droplet
620 Unactuated element
630 Actuated element
710 First step of fluid operation
715 Second step of fluid operation
720 Third step of fluid operation
725 Fourth step of fluid operation
810 Array of elements
820 Droplet
830 Actuation pattern
900 Actuation pattern
910 Unactuated element 920 Actuated element
930 Droplet
940 Further alternative actuation pattern
945 Further alternative actuation pattern
950 Further alternative actuation pattern
955 Further alternative actuation pattern
960 Further alternative actuation pattern
1010 Array of elements
1020 Droplet
1030 First actuation pattern
1040 Second actuation pattern
1050 Third actuation pattern
1060 Fourth actuation pattern
1200 Array of elements
1205 Actuation pattern
1210 Droplet
1220 Unactuated element
1230 Actuated element
1240 Balancing element
1400 EWOD device
1404 Droplet
1416 First hydrophobic coating layer
1420 Insulator layer
1426 Second hydrophobic coating layer
1430 First substrate
1432 Spacer
1434 Filler fluid
1435 Fluid gap
1436 Second substrate
1438 Set of element electrodes
1439 Element electrode
1600 Array of elements
1605 Actuation pattern
1610 Droplet
1620 Actuated element
1630 Unactuated element
1700 Array of elements
1705 Actuation pattern
1710 Droplet
1720 Unactuated element
1730 Actuated element
1800 EWOD device
1804 Droplet
1816 First hydrophobic coating layer
1820 Insulator layer
1830 First substrate
1838 Set of element electrodes
1839 Element electrode

DETAILED DESCRIPTION OF INVENTION

In a first and most general embodiment of the present invention, a droplet actuation method for reducing the electric field within a hydrophobic coating layer in a conventional EWOD device is provided. The actuation method may permit the manipulation of droplets on the EWOD device in order to perform a fluid protocol such as a chemical or biological reaction, test or the like.

Figure 2:
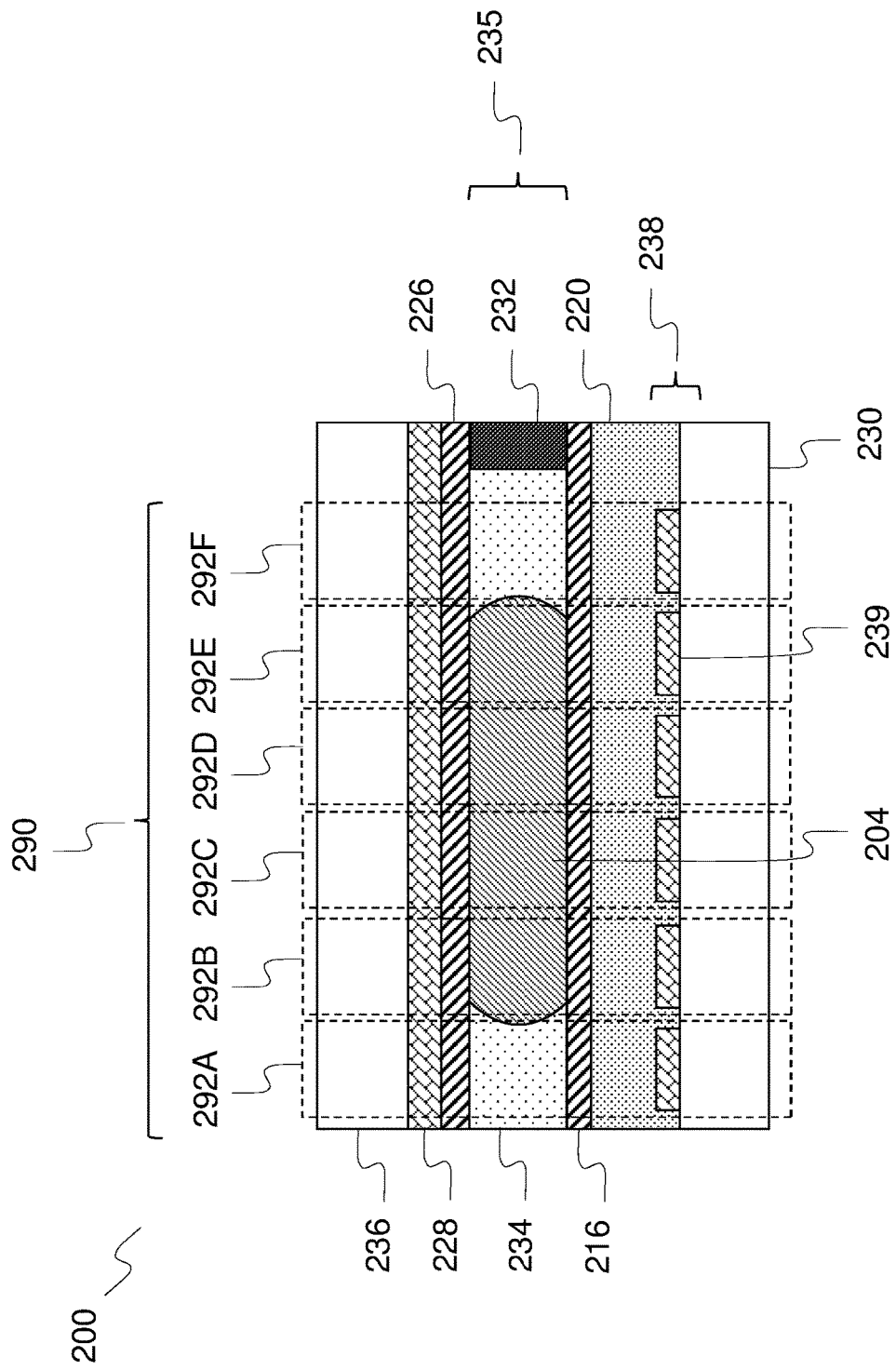
FIG. 2 shows a conventional structure for an EWOD device.

The structure of a conventional EWOD device 200, shown in FIG. 2, comprises a first substrate 230, a second substrate 236 and a spacer 232 disposed between the two substrates to form a fluid gap 235. The first substrate 230 includes a set of element electrodes 238, an insulator layer 220 and a first hydrophobic coating layer 216. The second substrate 236 includes a second common reference electrode 228 and a second hydrophobic coating layer 226. The fluid gap is filled with a filler fluid 234 and liquid droplets 204.

The EWOD device 200 may comprise an array of elements 290, such as elements 292A-292F. Each element 292A-F of the array of elements 290 may include an element electrode 239 from the set of element electrodes 238 and a portion of the second common reference electrode 228. A liquid droplet 204 may occupy the fluid gap corresponding to a subset of elements 292A-F in the array of elements, for example elements 292B to 292E in the example case of FIG. 2.

The first substrate 230 and second substrate 236 may be made of a transparent insulating material, such as glass. The conductive material used to form the element electrodes 239 of the set of element electrodes 238 and second electrode common reference electrode 228 may be a transparent conductor such as Indium Tin Oxide (ITO). The insulator layer 220 may be an inorganic insulator such as silicon nitride or silicon dioxide. Layers and structures may be formed on the substrates using standard manufacturing techniques, such as photolithography, common in for example, the LCD industry. The hydrophobic material may be a fluoropolymer. The filler fluid 234 may be a non-polar material such as oil. The liquid droplet 204 may be an aqueous and/or ionic fluid. The conductivity of the liquid droplet 204 may be substantially higher than that of the filler fluid 234.

Figure 3:
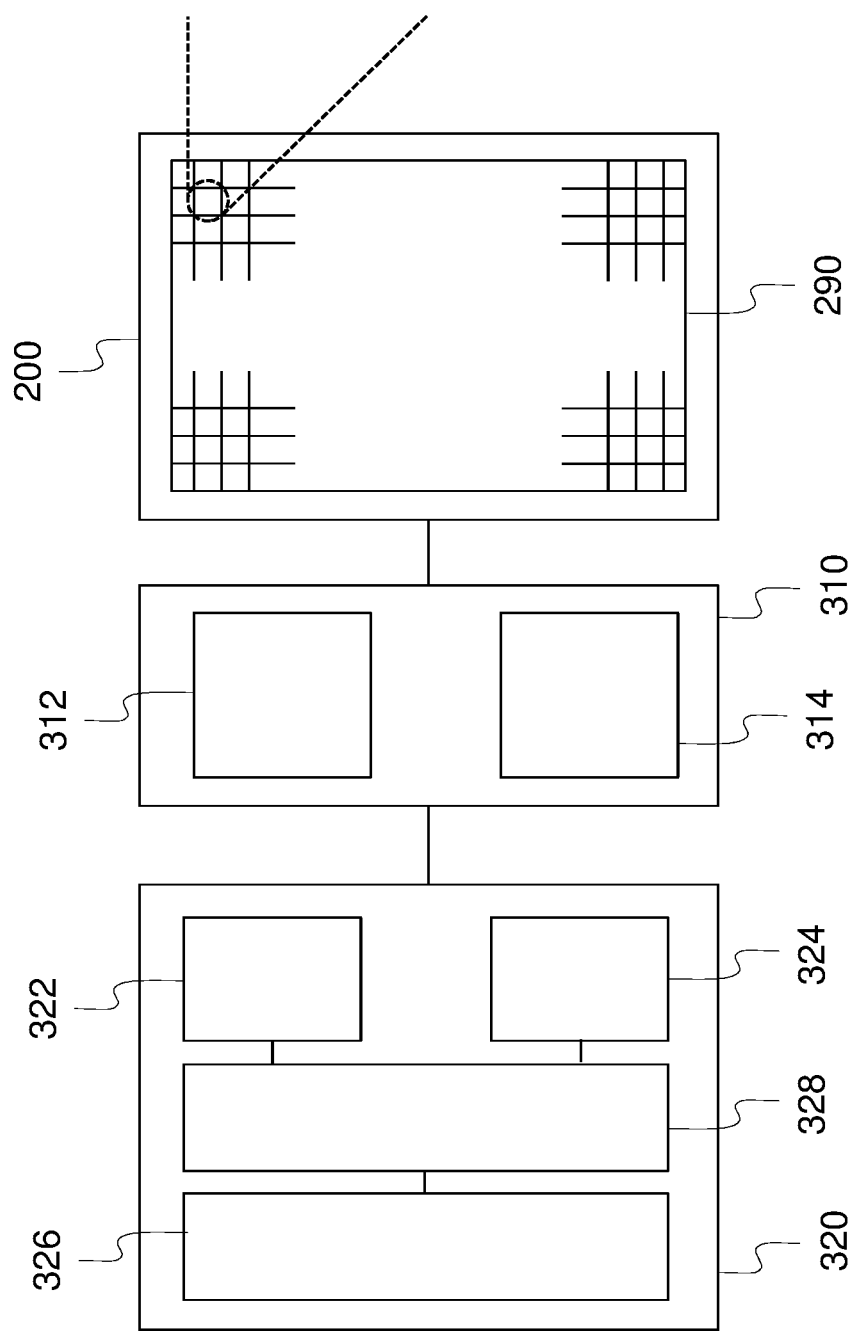
FIG. 3 shows an EWOD device and controller system.

As shown in FIG. 3, the EWOD device of FIG. 2 may be used as part of a microfluidic system in conjunction with a hardware controller 310 and a processing unit 320. The hardware controller unit 310 includes a signal generator unit 312 to generate the voltage signals applied to each element electrode 239 in the set of element electrodes 238. In a preferred embodiment, circuits within the EWOD device—for example integrated on the first substrate 230 using thin film transistors—may decode the voltage signals supplied by the signal generator unit and generate the voltage signals applied to each element electrode 239 in the set of element electrodes 238. Such circuits are well-known, for example as described in U.S. Pat. No. 8,653,832 (Hadwen et al, issued Feb. 18, 2014). Alternatively, as is well-known in the art, the signal generator unit 312 may apply the voltage signals directly to the element electrodes. The controller and/or processing unit that may be configured to execute program code for controlling actuation voltages being applied to the electrode elements on the array. It will be apparent to a person having ordinary skill in the art of computer programming, and specifically in application programming for electronic control devices, how to program the control system to operate and carry out logical functions associated with the stored control application. Accordingly, details as to specific programming code have been left out for the sake of brevity. Such electronic components may include a non-transitory computer readable medium that stores the executable program code, such as random access memory (RAM), a read-only memory (ROM), an erasable programmable read-only memory (EPROM or Flash memory), or any other suitable medium. Also, while the code may be executed by control electronics in accordance with an exemplary embodiment, such control system functionality could also be carried out via dedicated hardware, firmware, software, or combinations thereof, without departing from the scope of the invention.

In exemplary embodiments, the hardware controller unit 310 optionally also may include a droplet position detector 314 to detect the position, size and shape of liquid droplets 204 on the array of elements 290. In a preferred embodiment, circuits within each element 292 of the array of elements 290 of the EWOD device 200 may be used to measure the capacitance between an element electrode 239 and the second common reference electrode 228. Such circuits are well-known, for example as described in U.S. Pat. No. 8,653,832 (Hadwen et al, issued Feb. 18, 2014). In such an arrangement, the droplet position detector 314 may generate the signals to control the operation of said sensing circuit and process the signals generated by the sensing circuit to produce a map of the position, size and shape of the liquid droplets 204 across the array of elements. Alternatively, as is known in the art, the droplet position detector 314 may directly measure the capacitance of each element in the array of elements. Alternatively, as is known in the art, the droplet position detector 314 may be an optical imaging system and include an image processor to produce a map of the liquid droplet positions across the array of elements.

The processing unit 320 includes a pattern generator unit 322, a sensor data analysis unit 324, a memory unit 326 (i.e., a non-transitory computer readable medium) and an operation scheduler 328. The pattern generator unit 322 generates a map of elements in the array to be actuated, the actuation pattern, during one particular cycle of operation of the EWOD device. The pattern generator unit 322 is in communication with the signal generator unit 312 which converts the actuation pattern into voltage signals as described above. In embodiments including the position detector 314, the sensor data analysis unit 324 is in communication with the droplet position detector 314 and processes the map produced by the droplet position detector in order to identify and track individual liquid droplets 204 on the EWOD device 200. The memory unit 326 stores sequences of actuation patterns that define how to perform fluid operations, i.e. manipulations of the liquid droplets 204 on the EWOD device 200 to achieve a desired effect. The memory unit 326 further stores said actuation patterns for a range of distinct fluid operations in a library of fluid operations. Further still, the memory unit 326 also stores a predefined set of fluid operations to be performed on the EWOD device in order to perform a desired fluid protocol. The operation scheduler 328 executes the desired fluid protocol by monitoring the state of the sensor droplet analysis unit 324, and controlling pattern generator unit 322 to generate actuation patterns based on the sequences of actuation patterns, the library of fluid operations and the set of fluid operations stored in the memory unit 326.

Figure 4:
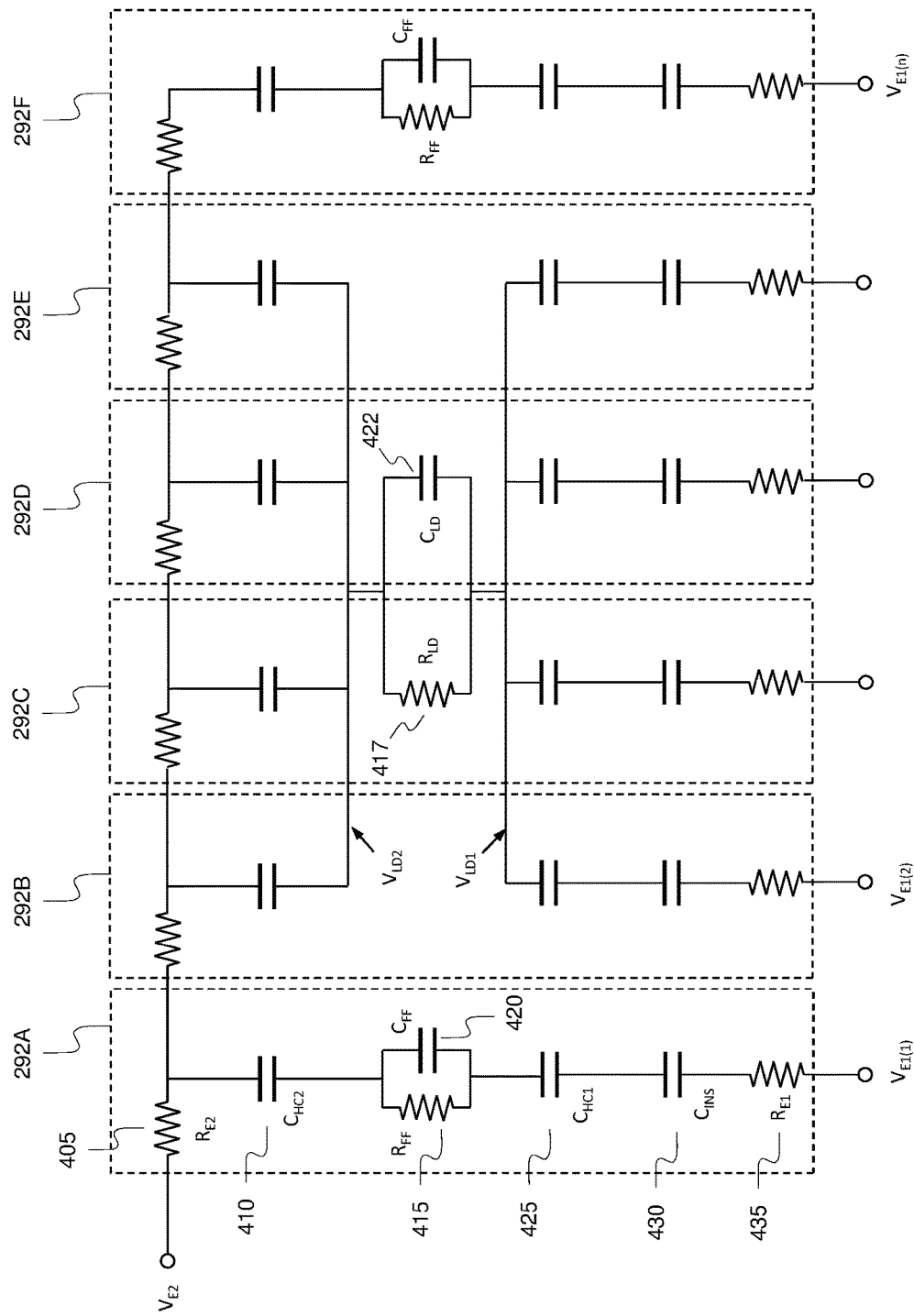
FIG. 4 shows an electrical model of an EWOD device.

FIG. 4 shows an electrical circuit model of the EWOD device 200 for the example case shown in FIG. 2. Each element 292A-F of the array of elements comprises:

a resistor $R_{E2}$ 405 representing the resistance of the second common reference electrode 280; a capacitor $C_{HC2}$ 410 representing the capacitance of the second hydrophobic coating layer 226;

a capacitor $C_{HC1}$ 425 representing the capacitance of the first hydrophobic coating layer 216;

a capacitor $C_{INS}$ 430 representing the capacitance of the insulator layer 220; and a resistor $R_{E1}$ 435 representing the resistance of an element electrode 239.

Those elements in the subset of elements corresponding to the location of the liquid droplet 204 additionally comprise a resistor $R_{LD}$ 417 and a capacitor $C_{LD}$ 422 representing the resistance and capacitance of the liquid droplet 204 respectively. The number of elements in the subset of elements corresponding to the location of the liquid droplet 204 is denoted by n. Those elements not corresponding to the location of a liquid droplet additionally comprise a resistor $R_{FF}$ 415 and a capacitor $C_{FF}$ 420 representing the resistance and capacitance of the filler fluid 234 respectively. The voltage of the liquid droplet at the surface of the first hydrophobic coating layer is denoted by $V_{LD1}$. The voltage of the liquid droplet at the surface of the second hydrophobic coating layer is denoted by $V_{LD2}$. Under typical operating conditions the conductivity of the droplet is such that the voltages $V_{LD1}$ and $V_{LD2}$ may be assumed to be equal and denoted by $V_{LD}$. The actuation voltage, $V_{ACT}$, is defined as the potential difference between the liquid droplet 204 and an element electrode 239 i.e. $V_{ACT}=V_{LD}-V_{E1(n)}$. For droplet actuation using the electrowetting technique, the magnitude of the electrowetting actuation voltage must be greater than the magnitude of the electrowetting threshold voltage, $V_{EW}$, i.e. $|V_{ACT}|>|V_{EW}|$.

In the region of a liquid droplet 204, the potential difference across the second hydrophobic coating layer, $\Delta V_{HC2}$ is related to the voltages applied to the corresponding element electrodes 239, the voltage applied to the second common reference electrode 228 and the capacitance of the capacitors formed within each element 292 of the array of elements 290 by the set of equations given in FIG. 5. Symbols in the set of equations correspond to the above description with $V_0$ being an initial potential of the liquid droplet. In this first and most general embodiment of the invention, a DC voltage signal of, for example, 0V is applied to the second common reference electrode 228 and the droplet initial potential $V_0=0V$. The potential difference across the second hydrophobic coating layer, $\Delta V_{HC2}$, is therefore proportional to the sum of the voltages, $V_{E1(n)}$, applied to the subset of element electrodes 239 of the set of first electrodes 238 corresponding to the region of the liquid droplet.

It has been observed that a necessary and sufficient condition for droplet actuation using the electrowetting technique is that the actuation voltage must be greater than the electrowetting threshold voltage in at least a part of the region of the contact line between the liquid droplet 204 and the filler fluid 234 and the surface of the first hydrophobic coating layer 216. The contact line essentially corresponds to a boundary of the liquid droplet. With reference to FIG. 2, application of an actuation voltage signal to the element electrode 239 of element 292B and 292E at or adjacent to the contact line is sufficient for actuation of the liquid droplet. The voltage of the element electrode 239 of elements 292C and 292D may be maintained at a constant level, for example equal to the voltage signal applied to the second common reference electrode without affecting droplet actuation. Thus, by application of an actuation voltage signal in only those array elements 292 corresponding to at least a part of the region of the array in a region at or adjacent to the contact line corresponding to a boundary of the droplet, droplet actuation may be achieved whilst minimizing the potential difference across the second hydrophobic coating layer, $\Delta V_{HC2}$.

Generally, therefore, an aspect of the invention is an enhanced microfluidic system and related control methods. In exemplary embodiments, the microfluidic system includes an electrowetting on dielectric (EWOD) device having an array of elements that are actuatable for manipulation of a liquid droplet within the EWOD device. The microfluidic system further may include a pattern generator that is configured to generate an actuation pattern for actuating a portion of the elements in the array of elements, and a signal generator that generates voltage signals for actuating elements in the array of elements in accordance with the actuation pattern. The pattern generator is configured to generate an actuation pattern in a region of the array of elements containing the liquid droplet, the actuation pattern including a first voltage signal that is applied to elements in a part of the region at or adjacent to a contact line of the liquid droplet with the array of elements, and a second voltage signal is applied to elements in a part of the region that is not at or adjacent to the contact line, and that the first and second voltage signals are different. For example, the pattern generator may be configured to generate an actuation pattern in which elements in at least part of the region at or adjacent to the contact line are actuated and elements that are not in the part of the region at or adjacent to the contact line are unactuated.

In many such microfluidic systems, the droplet is manipulated without sensor feedback. A pattern of actuated elements is applied and time is allowed (typically in the range ten milliseconds to a few seconds) for droplet movement to occur and the droplet to assume an equilibrium position, typically located over the actuated electrodes and corresponding to the lowest energy state of the system. The equilibrium position is typically quite reproducible such that multiple actuation patterns can be predetermined and arranged together in series in order to effect droplet operations and without requiring sensor feedback. Accordingly, a droplet sensor is an optional component, and thus exemplary embodiments lack such a sensor or other device that provides feedback as to droplet position or state.

Nevertheless, the inclusion of a component constituting a suitable droplet sensor, also referred to as a droplet position detector, within the system can be advantageous. The likelihood of errors occurring on individual droplet operations performed without feedback is low, but when many such operations are chained together or many droplets are manipulated in parallel, the probability of errors increases due to the increased number of operations. Under such circumstances, it can be advantageous to include a droplet position detector to act as a droplet sensor in the system. In additional exemplary embodiments, therefore, the system further may include a droplet position detector that tracks a position of the droplet within the EWOD device for determining the contact line constituting a boundary of the liquid droplet.

As referenced above, the pattern generator is configured to generate an actuation pattern in a region of the array of elements containing the liquid droplet. As used herein, the "region of the array of elements containing the liquid droplet" refers to a subset of the array elements on an EWOD device that when actuated can control or affect a droplet state or otherwise manipulate a droplet. Thus, the inventors have realized that contrary to conventional to know-how, the voltage signal applied to elements that are the region containing the liquid droplet, but otherwise not in a region specifically of the contact line that forms the droplet boundary, can influence the electro-wetting behavior at the contact line since they change the potential of the droplet. The claimed invention improves over conventional configurations by limiting the actuation pattern essentially only to those array elements at or adjacent to the boundary contact line of the droplet so as to minimize the number of array elements that need to be actuated.

Figure 6:
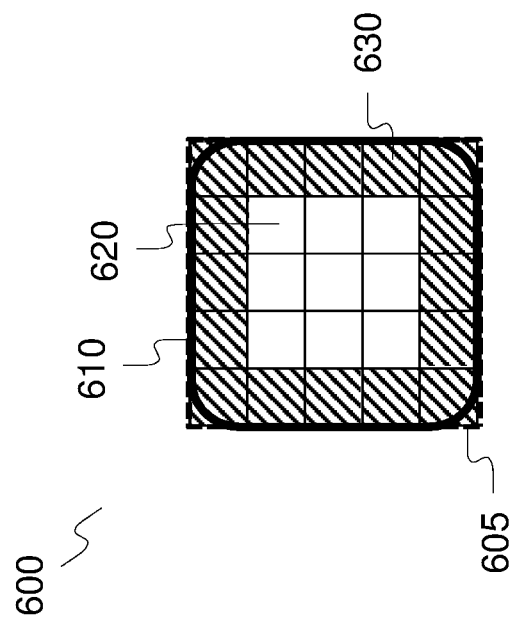
FIG. 6 shows an actuation pattern in accordance with the present invention.

An example actuation pattern using this droplet actuation method is shown in FIG. 6. In the example of FIG. 6, the pattern generator is configured to generate an actuation pattern in which elements around the entire contact line are actuated, and elements spaced apart from the contact line are unactuated. Array elements forming the actuation pattern 605 and corresponding to a droplet 610 occupying an area of 25 elements (5 elements×5 elements) on a region of the array of elements 600 may be either unactuated elements 620 (plain regions) or actuated elements 630 (hashed regions). Actuated elements are those to which an actuation voltage signal is applied. Unactuated elements are those to which an actuation voltage signal is not applied i.e. the applied voltage signal is less than the electrowetting threshold voltage or the element electrode is electrically isolated or floating. Actuated elements are located at the boundary of the droplet 610, i.e. in the region of the contact line. In this example the number of actuated elements is sixteen and the number of unactuated elements is nine. Accordingly, the potential difference across and electric field within the second hydrophobic coating layer is reduced compared to the conventional case where all elements are actuated by a factor of 16/25.

Actuation of liquid droplets enables a range of fluid operations to be performed on them. For example, liquid droplets may be:

held in a particular location on the array;
moved from one array element, or subset of array elements, to another;
split into multiple smaller droplets; and
mixed with other liquid droplets.

In exemplary embodiments, therefore, the pattern generator is configured to generate a sequence of actuation patterns to perform a droplet manipulation operation for a droplet within the EWOD device when the corresponding voltage signals are applied.

To perform a particular fluid operation on a particular droplet within the EWOD device, a sequence of actuation patterns is applied to the array as illustrated by the flow chart shown in FIG. 7. As described above, the sequence of actuation patterns to perform a particular fluid operation may be pre-defined and stored within the processing unit 320. In a first step for a particular fluid operation 710, at the start of the fluid operation the position and size of the particular droplet that is the target of the operation is identified by the sensor data analysis unit 324 based on the map of droplets provided by the droplet position detector 314. In a second step 715, the operation scheduler 328 controls the pattern generator unit 322 to generate an actuation pattern corresponding to the first actuation pattern in the sequence of actuation patterns for the particular fluid operation. Voltage signals corresponding to the actuation pattern are then generated by the signal generator unit 312 and applied to the EWOD device. The target droplet on the EWOD device 200 is now actuated. In a third step 720, the output of the sensor data analysis unit 324 is monitored by the operation scheduler 328 to ascertain whether or not the target droplet has been successfully actuated. On successful actuation, in a fourth step 725 the operation scheduler checks whether there are more actuation patterns in the sequence. If so, the second step 715 and third step 720 are repeated. This cycle continues until all actuation patterns in the sequence of actuation patterns for the particular fluid operation have been completed.

Figure 8C:
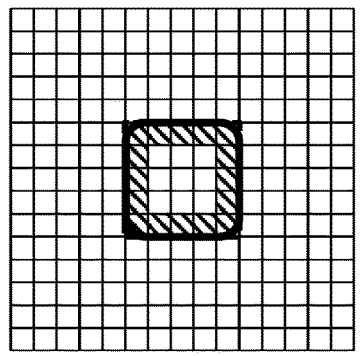
FIGS. 8A, 8B, 8C, 8D, 8E, and 8F show a sequence of actuation patterns to perform a move fluid operation in accordance with the present invention.
Figure 8F:
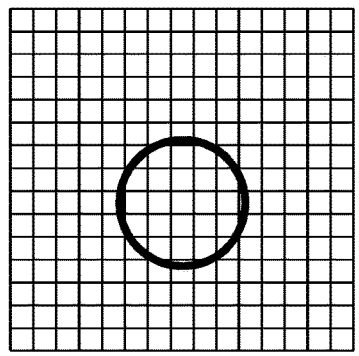
Figure 8B:
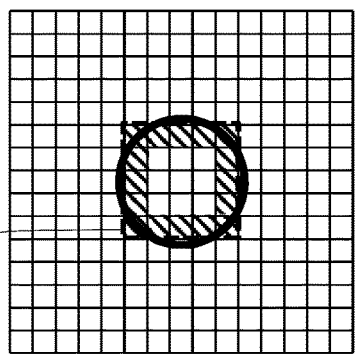
Figure 8E:
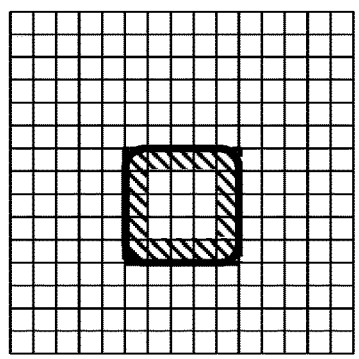
Figure 8A:
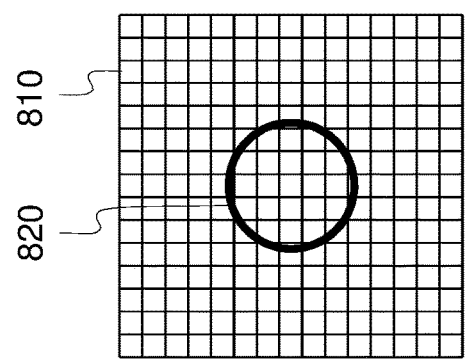
Figure 8D:
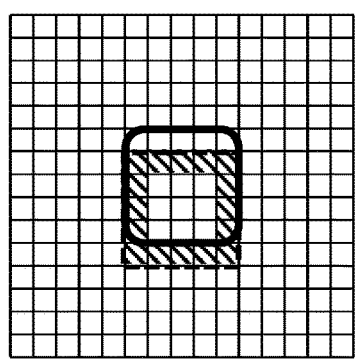

An example fluid operation and sequence of actuation patterns using the method described above is shown in FIG. 8A to FIG. 8F. In this example fluid operation, a droplet is moved across the array by a distance of one element. In an initial state prior to the fluid operation, FIG. 8A, a droplet 820 is at a first position on the array of elements 810. The position and size of the droplet is identified, and a first actuation pattern 830 is applied, FIG. 8B. As shown in the example of FIG. 8B, the first actuation pattern may include actuated elements at the contact line and unactuated elements spaced apart from the contact line, and the signal generator generates voltage signals in accordance with the first actuation pattern. As a result of the first actuation pattern the droplet then becomes actuated, FIG. 8C. The droplet actuation is detected and the second actuation pattern in the sequence is applied, FIG. 8D. As shown in the example of FIG. 8D, the second actuation pattern may correspond to the first actuation pattern of actuated and unactuated elements, with the second actuation pattern being shifted one element relative to the first actuation pattern, and the signal generator generates voltage signals in accordance with the second actuation pattern. In this example, the second actuation pattern has the same pattern of actuated and unactuated elements at the first actuation pattern but is shifted by one element to the left, although in similar fashion a shift in the actuation pattern in any direction may be employed to achieve a corresponding movement of the droplet. Application of the second actuation pattern actuates the droplet and causes it to move to the left by a distance of one element, FIG. 8E. The fluid operation is now complete, and the droplet may become unactuated in the new position, FIG. 8F.

In further embodiments of the present invention, the droplet actuation method described in the previous embodiment may employ alternative actuation patterns to further reduce the electric field in the second hydrophobic coating layer by employing actuation patterns that include actuated elements that are less than all the elements at the contact line. Actuation patterns in accordance with these further embodiments applied to the example of performing a fluid operation to move a droplet of approximate area 25 elements (5 elements×5 elements), as described in the previous embodiment, are shown in FIG. 9A to FIG. 9E. All of FIG. 9A to FIG. 9E show unactuated elements 910 (plain regions) and actuated elements 920 (hashed regions) in relation to the position of an unactuated droplet 930. In each case an electrowetting force is applied to the droplet only in the region of the contact line corresponding to the actuated elements. Arrows indicate direction of motion of the droplet due to the move fluid operation.

Figure 9C:
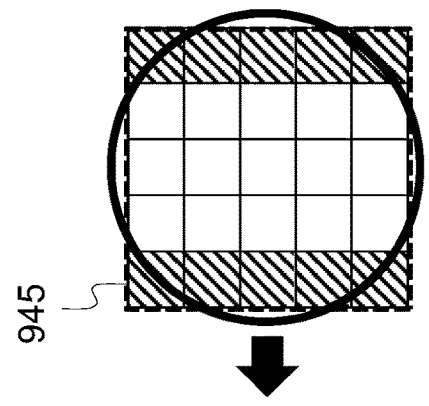
FIGS. 9A, 9B, 9C, 9D, 9E, and 9F show actuation patterns in accordance with the present invention.
Figure 9B:
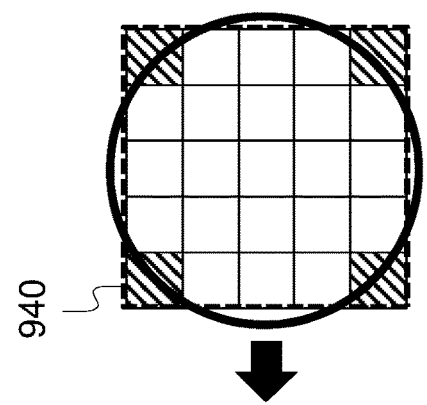
Figure 9A:
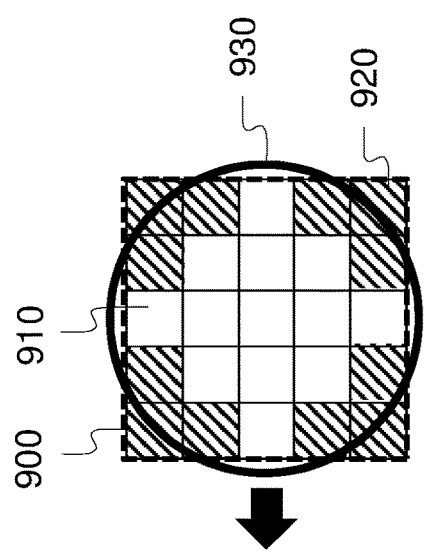

FIG. 9A shows an alternative actuation pattern 900 in which all elements in the region of the droplet contact line are actuated except for the elements in the middle of each edge which are unactuated. Advantageously, this actuation pattern reduces the electric field in the second hydrophobic coating layer. Due to the reduction in actuated area at the leading edge of the droplet (i.e. the edge of the droplet at the side corresponding to the direction of motion caused by the fluid operation), this actuation pattern also has the disadvantage of reducing the electrowetting force applied to the droplet compared to the actuation pattern of the first embodiment (FIG. 6). This reduced electrowetting force may have deleterious effects such as a reduction in the speed at which the droplet may move.

FIG. 9B shows a further alternative actuation pattern 940 in which only the elements corresponding to the approximate corner of the droplet are actuated elements. This actuation pattern further reduces the electric field in the second hydrophobic coating layer compared to the actuation pattern of the first embodiment (FIG. 6), but also further reduces the electro-wetting force.

FIG. 9C shows a further alternative actuation pattern 945 in which only the elements at the leading and trailing edge of the droplet are actuated elements. This actuation pattern reduces the electric field in the second hydrophobic coating layer compared to the actuation pattern of the first embodiment (FIG. 6), and also maintains an equivalent electro-wetting force.

Figure 9F:
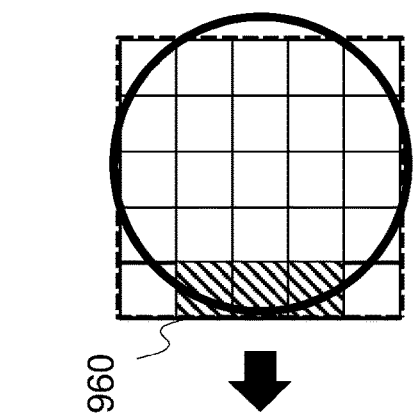
Figure 9E:
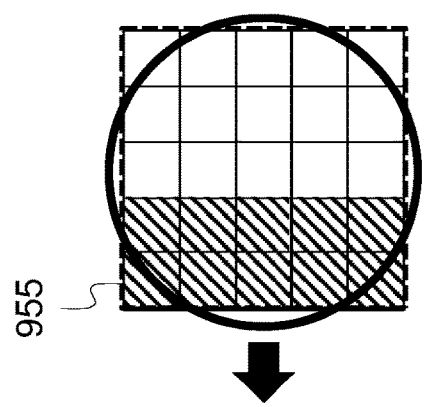
Figure 9D:
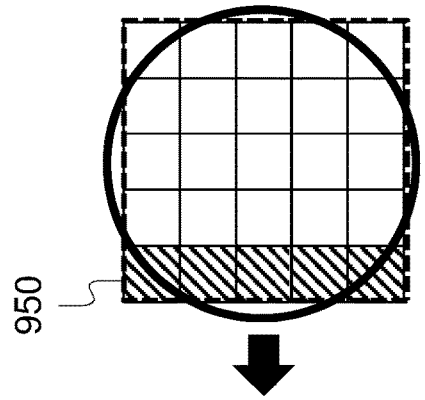

FIG. 9D shows a further alternative actuation pattern 950 in which only the elements at the leading edge of the droplet are actuated elements. This actuation pattern reduces the electric field in the second hydrophobic coating layer compared to the actuation pattern of the first embodiment (FIG. 6), and also maintains an equivalent electro-wetting force.

FIG. 9E shows a further alternative actuation pattern 955 in which only the elements in the region of the leading edge of the droplet are actuated elements where said region extends beyond the elements immediately coincident with the leading edge. This actuation pattern reduces the electric field in the second hydrophobic coating layer compared to the actuation pattern of the first embodiment (FIG. 6), and also further reduces the electro-wetting force. This actuation pattern may have advantageous effects such as an increase in the speed at which a droplet may move compared to the actuation pattern of FIG. 9D.

FIG. 9F shows a further alternative actuation pattern 960 in which only a subset of the elements at the leading edge of the droplet are actuated elements. This actuation pattern reduces the electric field in the second hydrophobic coating layer compared to the actuation pattern of the first embodiment (FIG. 6), and also reduces the electro-wetting force.

It will be appreciated by those skilled in the art that the droplet actuation methods described above may be applied to any fluid operation. As a further example, FIG. 10A to FIG. 10J show how a fluid operation to split a droplet into two smaller droplets may be accomplished using the droplet actuation method of the present invention. Generally, splitting a droplet may be achieved by applying a first actuation pattern including actuated elements at the contact line on opposite sides of the droplet and unactuated elements spaced apart from the contact line, and the signal generator generates voltage signals in accordance with the first actuation pattern. After this initial actuation in accordance with the first actuation pattern, subsequent actuation patterns may be applied corresponding to the first actuation pattern of actuated and unactuated elements, with the subsequent actuation patterns being sequentially shifted relative to the first actuation pattern in opposing directions on opposite sides of the contact line, and the signal generator generates voltage signals in accordance with the subsequent actuation patterns thereby splitting the droplet.

Figure 10C:
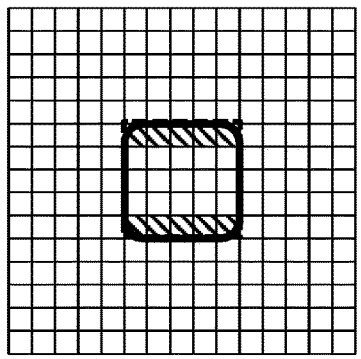
FIGS. 10A, 10B, 10C, 10D, 10E, 10F, 10G, 10H, 10I, and 10J show a sequence of actuation patterns to perform a split fluid operation in accordance with the present invention.
Figure 10F:
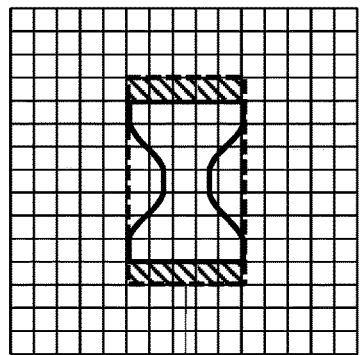
Figure 10B:
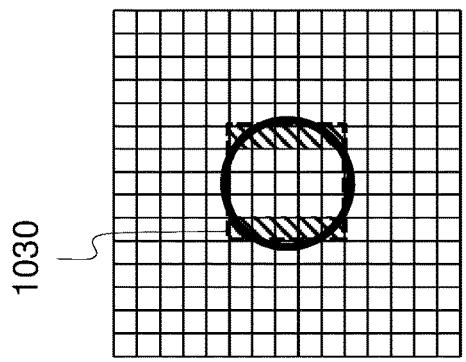
Figure 10E:
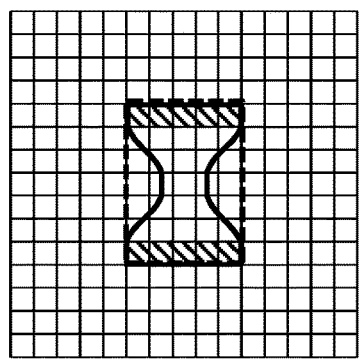
Figure 10A:
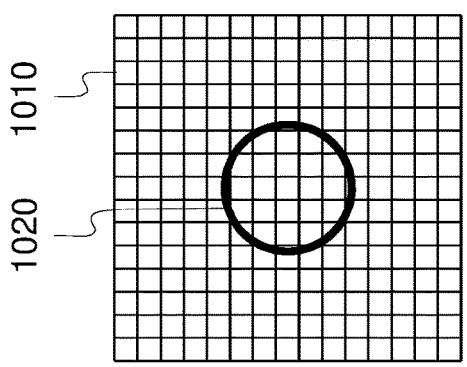
Figure 10D:
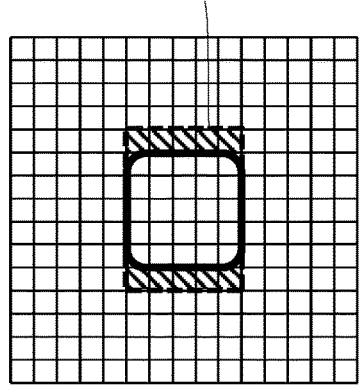
Figure 10I:
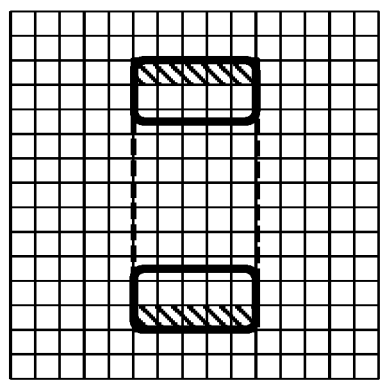
Figure 10H:
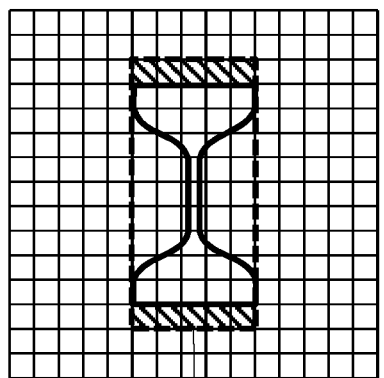
Figure 10G:
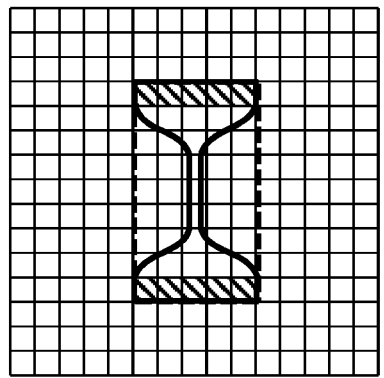
Figure 10J:
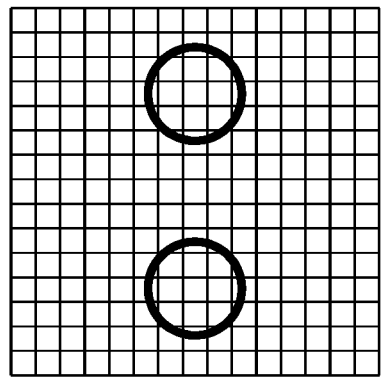

Referring to the example of FIG. 10, in an initial state prior to the fluid operation, FIG. 10A, a droplet 1020 is at a first position on the array of elements 1010. The position and size of the droplet is identified and a first actuation pattern 1030 is applied, FIG. 10B. As shown in FIG. 10B, the first actuation pattern may include actuated elements at the contact line on opposite sides of the droplet and unactuated elements spaced apart from the contact line, and the signal generator generates voltage signals in accordance with the first actuation pattern. As a result of the first actuation pattern the droplet then becomes actuated, FIG. 10C. The droplet actuation is detected and the second actuation pattern 1040 in the sequence is applied, FIG. 10D. As shown in FIG. 10D, a second actuation pattern may correspond to the first actuation pattern of actuated and unactuated elements, with the second actuation pattern being shifted one element relative to the first actuation pattern in opposing directions on opposite sides of the contact line, and the signal generator generates voltage signals in accordance with the second actuation pattern. In this example, the second actuation pattern has actuated elements in the region of the droplet contact line at the left-hand and right-hand side of the droplet, although as above, throughout this method the split may be in other directions so along as the actuated and unactuated elements are shifted on opposite sides of the droplet. Application of the second actuation pattern causes the droplet, when actuated by this pattern, FIG. 10E, to be stretched such that it elongates and narrows in the middle. Once actuation of the droplet in the second actuation pattern is detected the third actuation pattern 1050 in the sequence is applied, FIG. 10F. Referring to FIG. 10F, the third actuation pattern may correspond to the second actuation pattern of actuated and unactuated elements, with the third actuation pattern being shifted one element relative to the second actuation pattern in opposing directions on opposite sides of the contact line, and the signal generator generates voltage signals in accordance with the third actuation pattern. When the droplet is actuated by this third actuation pattern, FIG. 10G, it is further elongated and the middle portion of the droplet forms a narrow neck. Once actuation of the droplet in the third actuation pattern is detected, the fourth actuation pattern 1060 in the sequence is applied, FIG. 10H. Referring to FIG. 10H, the fourth actuation pattern may correspond to the third actuation pattern of actuated and unactuated elements, with the fourth actuation pattern being shifted one element relative to the third actuation pattern in opposing directions on opposite sides of the contact line, and the signal generator generates voltage signals in accordance with the fourth actuation pattern. Actuation of the droplet in the fourth actuation pattern, FIG. 10I, causes the droplet to split into two separate droplets. The fluid operation is now complete and droplets resulting from the operation may become unactuated in their new position, FIG. 10J.

Figure 11:
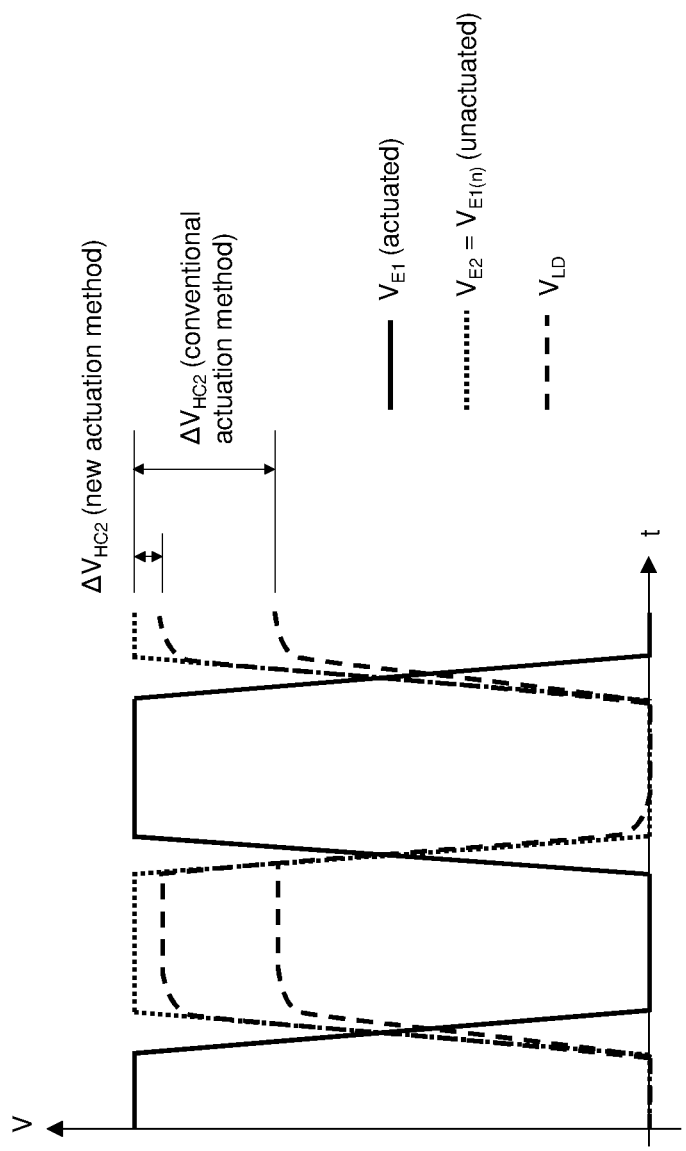
FIG. 11 shows a waveform diagram depicting AC voltage signals applied to an EWOD device in accordance with the droplet actuation method of the present invention.

In a further embodiment of the present invention, a droplet actuation method in accordance with any of the preceding embodiments is applied to an EWOD device in which AC voltage signals are applied to the element electrodes and common reference electrode. Example voltage signals applied to the common reference electrode, actuated elements and unactuated elements, and the resulting liquid droplet voltage are shown in FIG. 11. The voltage signal applied to the unactuated elements is in-phase and of similar magnitude to the voltage signal applied to the common reference electrode. The voltage signal applied to the actuated elements is of a similar magnitude as that applied to the common reference electrode but 180 degrees out of phase. As depicted, the potential difference, $\Delta V_{HC2}$, between the common reference electrode, $V_{E2}$, and the droplet, $V_{LD}$, is reduced in the case of the actuation pattern of the present invention compared to a conventional actuation pattern in which essentially all elements in the region of the droplet are actuated. Additionally, the magnitude of the electrowetting actuation voltage, $V_{ACT}$, which is the potential difference between the voltage of the liquid droplet, $V_{LD}$, and the voltage of the actuated elements, $V_{E1(actuated)}$, is increased. Accordingly, the electrowetting force may be enhanced and the performance of the EWOD device may be improved.

In a further embodiment of the present invention, a droplet actuation method in accordance with the present invention, and in which elements corresponding to the position of a droplet but not in the region of the contact line, may be of a third balancing state. The third balancing state is neither an actuated state nor an unactuated state and provides an adjustment to the voltage of the droplet, $V_{LD}$, which may reduce the electric field in the second hydrophobic coating layer to zero. In this embodiment, the pattern generator is configured to generate an actuation pattern in which voltage signals that are applied to a portion of the elements that are not in the part of the region at or adjacent to the contact line include a balancing voltage that is less than an actuation voltage for actuating the actuated elements.

Figure 12:
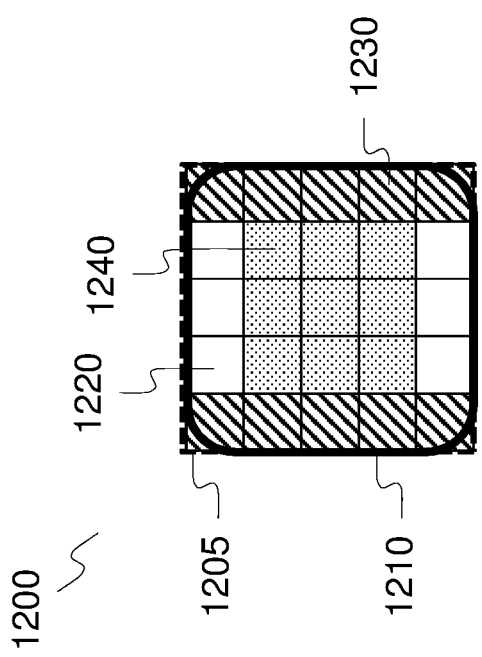
FIG. 12 shows an actuation pattern in accordance with the present invention.
Figure 13:
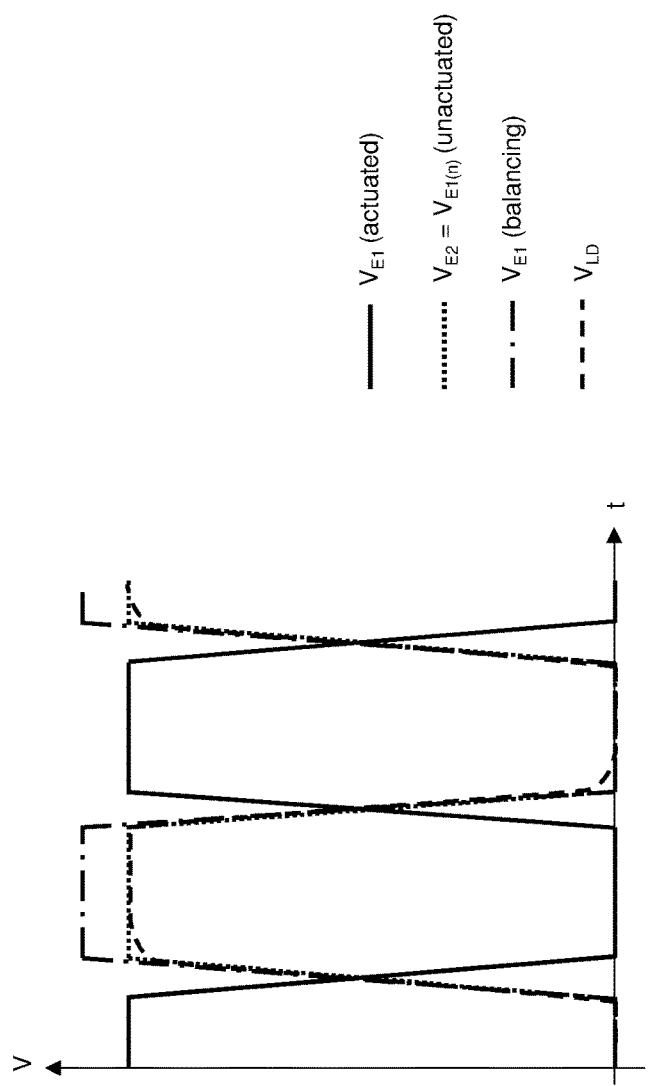
FIG. 13 shows a waveform diagram depicting AC voltage signals applied to an EWOD device for the example actuation pattern shown in FIG. 12.

An example actuation pattern using this droplet actuation method with a balancing voltage is shown in FIG. 12. Array elements forming the actuation pattern 1205 and corresponding to a droplet 1210 occupying an area of 25 elements (5 elements×5 elements) on a region of the array of elements 1200 may be either unactuated elements 1220 (plain regions), actuated elements 1230 (hashed regions), or balancing elements 1240 (dotted regions). Actuated elements and unactuated elements are as previously defined. Balancing elements are those to which a balancing voltage signal is applied. An example balancing voltage signal for the case of AC voltage signals is shown in FIG. 13. As depicted, the balancing signal is in-phase with the voltage signal applied to unactuated elements, and of a larger magnitude as compared to the voltage signal applied to unactuated elements but less than an actuation voltage for actuating the actuated elements. By adjustment of the magnitude of the balancing voltage signal or by the number of balancing elements in the actuation pattern, the voltage of the droplet, $V_{LD}$, may be made equal to the voltage of the voltage signal applied to the common reference electrode, $V_{E2}$. Accordingly, the potential difference across and electric field within the second hydrophobic coating layer is reduced to zero.

In a further embodiment of the present invention, the droplet actuation method described in any of the preceding embodiments is applied to an EWOD device without a second common reference electrode. An advantage of the method described in the present embodiment is that a simpler device structure may be employed thus reducing the manufacturing cost of the EWOD device.

Figure 14:
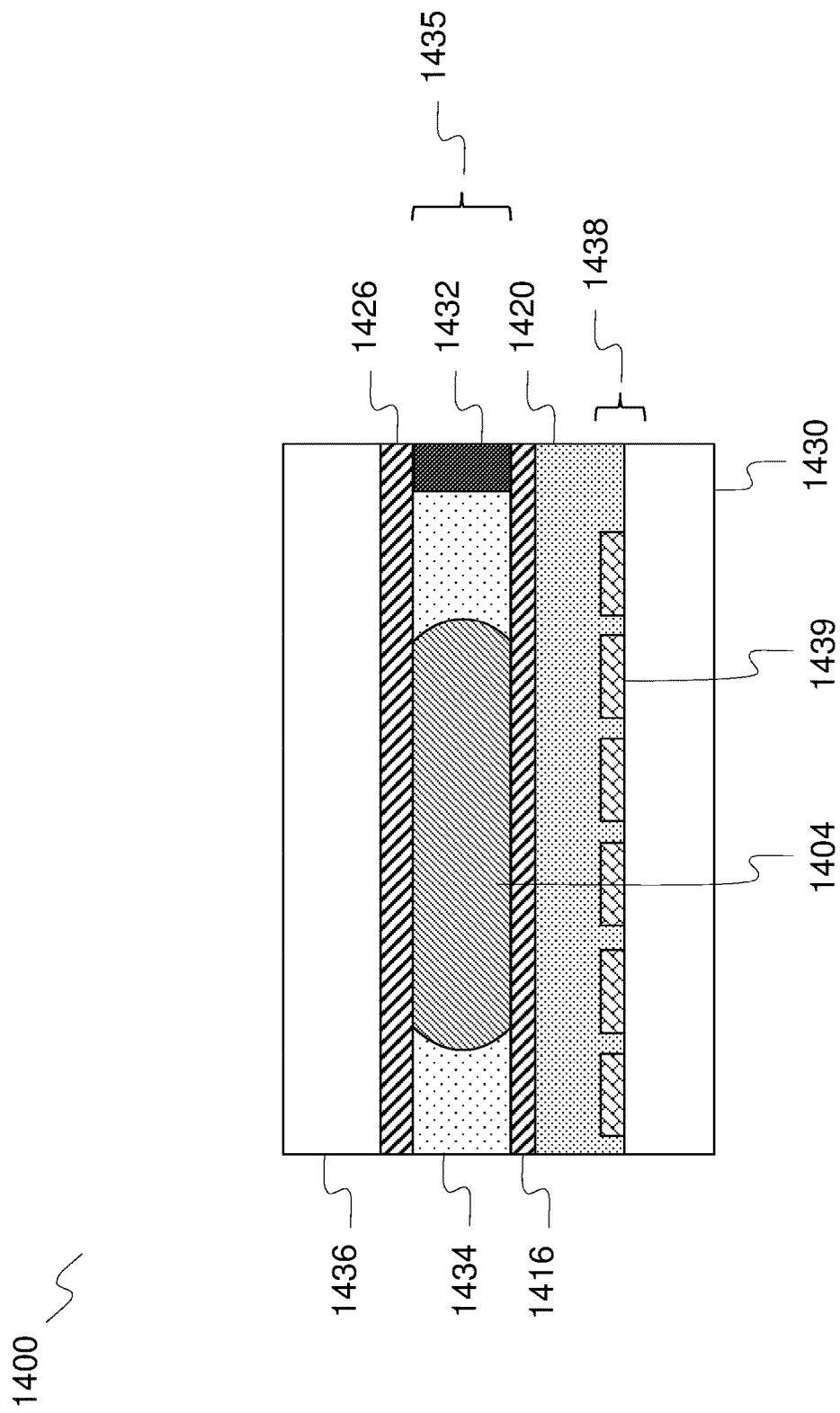
FIG. 14 shows an alternative structure for an EWOD device.

FIG. 14 shows the structure of an EWOD device 1400 without a second common electrode structure. The device comprises a first substrate 1430, a second substrate 1436 and a spacer 1432 disposed between the two substrates to form a fluid gap 1435. The first substrate 1430 includes a set of element electrodes 1438 patterned into individual element electrodes 1439, an insulator layer 1420 and a first hydrophobic coating layer 1416. The second substrate 1436 is coated with a second hydrophobic coating layer 1426. The fluid gap is filled with a filler fluid 1434 and liquid droplets 1404. Alternatively, the second substrate 1436 and second hydrophobic coating layer 1426 may be replaced by a substrate in which the surface of the substrate in contact with the filler fluid 1434 and liquid droplet 1404 is inherently hydrophobic. On application of voltage signals to the element electrodes corresponding to the position of a liquid droplet 1404, the voltage of the droplet assumes a level as defined by the equation shown in FIG. 15. Symbols in the set of equations of FIG. 15 are as used previously with $V_0$ indicating an initial potential of the droplet which may be zero. Actuation of the liquid droplet 1404 occurs when the actuation voltage, $V_{ACT}$—the potential difference between the droplet and the element electrodes in the region of the droplet contact line—exceeds the electrowetting threshold voltage, $V_{EW}$.

Figure 16:
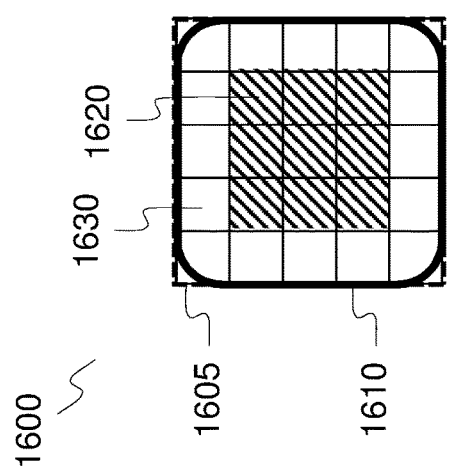
FIG. 16 shows an inverse actuation pattern in accordance with the present invention.

Alternatively, an inverse actuation pattern of the form shown in FIG. 16 may be used in conjunction with the EWOD device 1400 of the present embodiment. Generally, in an inverse actuation pattern, the pattern generator is configured to generate an actuation pattern in which elements in the at least part of the region at or adjacent to the contact line are unactuated and elements that are not in the part of the region at or adjacent to the contact line are actuated.

An example actuation pattern using this droplet actuation method with inverse actuation pattern is shown in FIG. 16. Array elements of the actuation pattern 1605 and corresponding to a droplet 1610 occupying an area of 25 elements (5 elements×5 elements) on a region of the array of elements 1600 of the EWOD device 1400 may be either unactuated elements 1620 (plain regions) or actuated elements 1630 (hashed regions). Actuated elements are those to which an actuation voltage signal is applied. Unactuated elements are those to which an actuation voltage signal is not applied, i.e. the applied voltage signal is less than the electrowetting threshold voltage or the element electrode is electrically isolated or floating. Actuated elements are located in at least a part of the central region of the droplet, i.e. not in the region of the contact line. In this example the number of actuated elements is nine and all of the elements in the central region are actuated elements. The number of unactuated elements is sixteen and all of the elements in the region of the contact line are unactuated. In accordance with the set of equations of FIG. 15 and assuming $V_0=0$, the voltage of the liquid droplet is therefore $$V_{LD} = 1/25 \times 9 \cdot \Delta V_{E1}$$

Provided that the magnitude of the applied voltage $\Delta V_{E1}$ is sufficient that the potential difference between the droplet and the elements in the region of the droplet contact line exceeds the electrowetting threshold voltage i.e. $|V_{LD} - V_{E1(unactuated)}| > |V_{EW}|$, the droplet will become actuated.

Figure 17:
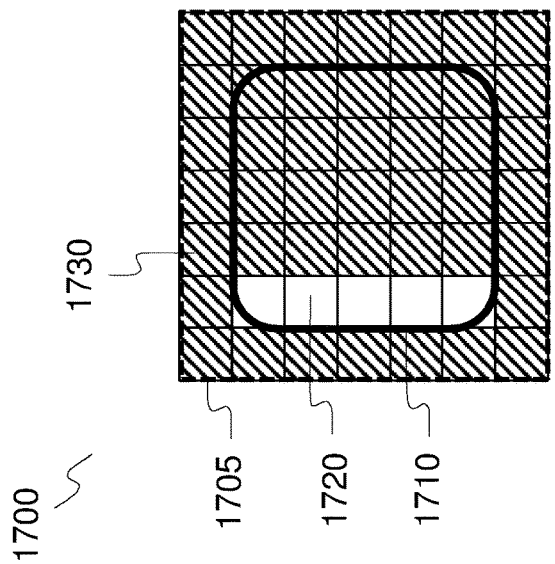
FIG. 17 shows an alternative inverse actuation pattern in accordance with the present invention.

By way of further example, an alternative inverse actuation pattern is shown in FIG. 17. Array elements of the actuation pattern 1705 and corresponding to a droplet 1710 occupying an area of 25 elements (5 elements×5 elements) on a region of the array of elements 1700 of the EWOD device 1400 may be either unactuated elements 1720 (plain regions) or actuated elements 1730 (hashed regions). Actuated elements and unactuated elements are as previously defined. Unactuated elements may correspond to at least a part of the region of the droplet contact line. Actuated elements may correspond to the region of the droplet contact line or the central region of the droplet. Actuated elements may also correspond to the region in the vicinity of but outside the droplet. In this example the number of unactuated elements is five and the number of actuated elements within the droplet region is twenty. In accordance with the set of equations of FIG. 15 and assuming $V_0=0$, the voltage of the liquid droplet is therefore $$V_{LD} = 1/25 \times 20 \cdot \Delta V_{E1}$$

The magnitude of the actuation voltage signal required to cause droplet actuation may therefore be reduced compared to the previous example. Provided that the potential difference between droplet and the actuated elements is less than the electrowetting threshold voltage, i.e. $|V_{LD} - V_{E1(actuated)}| < |V_{EW}|$, the electrowetting force is, as desired, applied to the droplet only in the region of the contact line corresponding to the unactuated elements.

Figure 18:
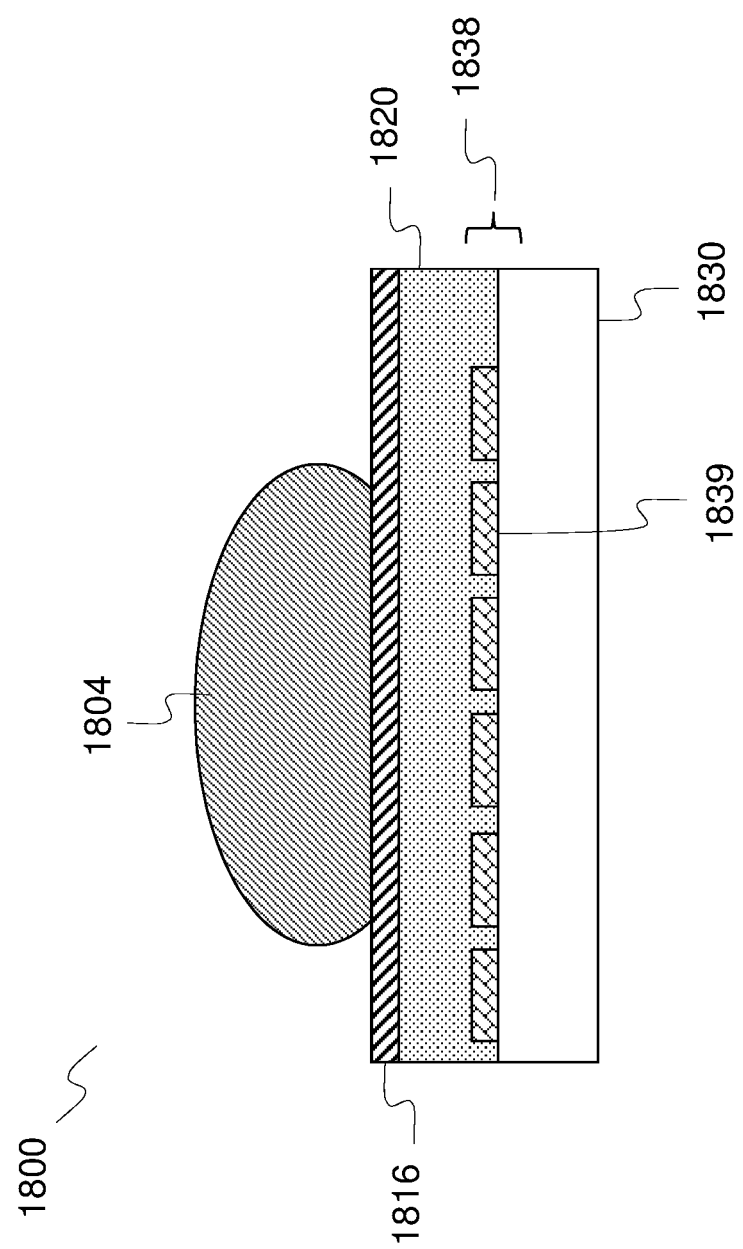
FIG. 18 shows an alternative structure for an EWOD device.

In a further embodiment of the present invention, the droplet actuation method described in preceding embodiments is applied to an EWOD device without a second substrate. The second substrate may be absent either entirely or absent above only a part of the array of elements, for example so as to provide a port (i.e. hole) for the loading of fluids into the EWOD device. FIG. 18 shows the structure of a EWOD device 1800 without a second substrate. The device comprises a first substrate 1830 on which is formed a set of element electrodes 1838 patterned into individual element electrodes 1839, an insulator layer 1820 and a first hydrophobic coating layer 1816. Liquid droplets 1804 may be manipulated on the surface of the first hydrophobic coating layer 1816 by means of application of voltage signals to the set of element electrodes 1838 in accordance with the droplet actuation methods described above. In particular, it may be advantageous to manipulate droplets on the EWOD device 1800 using an inverse actuation pattern as described above.

An aspect of the invention, therefore, is an enhanced microfluidic system and related control methods. In exemplary embodiments, the microfluidic system includes an electrowetting on dielectric (EWOD) device comprising an array of elements that are actuatable for manipulation of a liquid droplet within the EWOD device, a pattern generator that is configured to generate an actuation pattern for actuating a portion of the elements in the array of elements, and a signal generator that generates voltage signals for actuating elements in the array of elements in accordance with the actuation pattern. The pattern generator is configured to generate an actuation pattern in a region of the array of elements containing the liquid droplet, the actuation pattern including a first voltage signal that is applied to elements in a part of the region at or adjacent to a contact line of the liquid droplet with the array of elements, and a second voltage signal is applied to elements in a part of the region that is not at or adjacent to the contact line, and that the first and second voltage signals are different. The microfluidic system may include one or more of the following features, either individually or in combination.

In an exemplary embodiment of the microfluidic system, the pattern generator is configured to generate an actuation pattern in which elements in at least part of the region at or adjacent to the contact line are actuated and elements that are not in the part of the region at or adjacent to the contact line are unactuated.

In an exemplary embodiment of the microfluidic system, the pattern generator is configured to generate an actuation pattern in which elements around the entire contact line are actuated, and elements spaced apart from the contact line are unactuated.

In an exemplary embodiment of the microfluidic system, wherein a proportion of the elements spaced apart from the contact line that are unactuated is 50% or greater relative to the actuated elements.

In an exemplary embodiment of the microfluidic system, the pattern generator is configured to generate a sequence of actuation patterns to perform a droplet manipulation operation for a droplet within the EWOD device when the signal generator applies the voltage signals.

In an exemplary embodiment of the microfluidic system, the pattern generator is configured to generate a sequence of actuation patterns to perform a droplet manipulation operation for moving a droplet within the EWOD device when the signal generator applies the voltage signals, the sequence of actuation patterns comprising: applying a first actuation pattern including actuated elements at the contact line and unactuated elements spaced apart from the contact line, wherein the signal generator generates voltage signals in accordance with the first actuation pattern; and applying a second actuation pattern corresponding to the first actuation pattern of actuated and unactuated elements, with the second actuation pattern being shifted one element relative to the first actuation pattern, wherein the signal generator generates voltage signals in accordance with the second actuation pattern.

In an exemplary embodiment of the microfluidic system, the first actuation pattern includes actuated elements that include less than all the elements at the contact line.

In an exemplary embodiment of the microfluidic system, the pattern generator is configured to generate a sequence of actuation patterns to perform a droplet manipulation operation for splitting a droplet within the EWOD device when the signal generator applies the voltage signals, the sequence of actuation patterns comprising: applying a first actuation pattern including actuated elements at the contact line on opposite sides of the droplet and unactuated elements spaced apart from the contact line, wherein the signal generator generates voltage signals in accordance with the first actuation pattern; and applying subsequent actuation patterns corresponding to the first actuation pattern of actuated and unactuated elements, with the subsequent actuation patterns being sequentially shifted relative to the first actuation pattern in opposing directions on opposite sides of the contact line, wherein the signal generator generates voltage signals in accordance with the subsequent actuation patterns thereby splitting the droplet.

In an exemplary embodiment of the microfluidic system, the pattern generator is configured to generate the sequence of actuation patterns to perform a droplet manipulation operation for splitting a droplet within the EWOD device, the sequence of actuation patterns comprising: applying a first actuation pattern including actuated elements at the contact line on opposite sides of the droplet and unactuated elements spaced apart from the contact line, wherein the signal generator generates voltage signals in accordance with the first actuation pattern; applying a second actuation pattern corresponding to the first actuation pattern of actuated and unactuated elements, with the second actuation pattern being shifted one element relative to the first actuation pattern in opposing directions on opposite sides of the contact line, wherein the signal generator generates voltage signals in accordance with the second actuation pattern; applying a third actuation pattern corresponding to the second actuation pattern of actuated and unactuated elements, with the third actuation pattern being shifted one element relative to the second actuation pattern in opposing directions on opposite sides of the contact line, wherein the signal generator generates voltage signals in accordance with the third actuation pattern; and applying a fourth actuation pattern corresponding to the third actuation pattern of actuated and unactuated elements, with the fourth actuation pattern being shifted one element relative to the third actuation pattern in opposing directions on opposite sides of the contact line, wherein the signal generator generates voltage signals in accordance with the fourth actuation pattern thereby splitting the droplet.

In an exemplary embodiment of the microfluidic system, the pattern generator is configured to generate an actuation pattern in which voltage signals that are applied to a portion of the elements that are not in the part of the region at or adjacent to the contact line include a balancing voltage that is less than an actuation voltage for actuating the actuated elements.

In an exemplary embodiment of the microfluidic system, the pattern generator is configured to generate an actuation pattern in which elements in the at least part of the region at or adjacent to the contact line are unactuated and elements that are not in the part of the region at or adjacent to the contact line are actuated.

In an exemplary embodiment of the microfluidic system, the array of elements includes a set of element electrodes patterned in individual electrode elements to which the signal generator applies the voltage signals.

In an exemplary embodiment of the microfluidic system, the array of elements includes a first substrate on which the set of element electrodes is deposited.

In an exemplary embodiment of the microfluidic system, the system further includes a droplet position detector that tracks a position of the droplet within the EWOD device for determining the contact line constituting a boundary of the liquid droplet.

Another aspect of the invention is a method of performing a droplet manipulation in a microfluid system including an electrowetting on dielectric (EWOD) device having an array of elements that are actuatable for manipulation of a liquid droplet within the EWOD device. In exemplary embodiments, the method includes the steps of: generating an actuation pattern for actuating a portion of the elements in the array of elements; and applying voltage signals to actuate elements in the array of elements in accordance with the actuation pattern. The actuation pattern includes voltage signals applied in a region of the array of elements containing the liquid droplet, the actuation pattern including a first voltage signal that is applied to elements in a part of the region at or adjacent to a contact line of the liquid droplet with the array of elements, and a second voltage signal is applied to elements in a part of the region that is not at or adjacent to the contact line, and that the first and second voltage signals are different. The method may include one or more of the following features, either individually or in combination.

In an exemplary embodiment of the method, generating the actuation pattern comprises generating a sequence of actuation patterns to perform a droplet manipulation operation for moving a droplet within the EWOD device when the signal generator applies the voltage signals, the sequence of actuation patterns comprising: applying a first actuation pattern including actuated elements at the contact line and unactuated elements spaced apart from the contact line, wherein the signal generator generates voltage signals in accordance with the first actuation pattern; and applying a second actuation pattern corresponding to the first actuation pattern of actuated and unactuated elements, with the second actuation pattern being shifted one element relative to the first actuation pattern, wherein the signal generator generates voltage signals in accordance with the second actuation pattern.

In an exemplary embodiment of the method, generating the actuation pattern comprises generating a sequence of actuation patterns to perform a droplet manipulation operation for splitting a droplet within the EWOD device when the signal generator applies the voltage signals, the sequence of actuation patterns comprising: applying a first actuation pattern including actuated elements at the contact line on opposite sides of the droplet and unactuated elements spaced apart from the contact line, wherein the signal generator generates voltage signals in accordance with the first actuation pattern; and applying subsequent actuation patterns corresponding to the first actuation pattern of actuated and unactuated elements, with the subsequent actuation patterns being sequentially shifted relative to the first actuation pattern in opposing directions on opposite sides of the contact line, wherein the signal generator generates voltage signals in accordance with the subsequent actuation patterns thereby splitting the droplet.

In an exemplary embodiment of the method, generating the actuation pattern comprises generating a sequence of actuation patterns to perform a droplet manipulation operation for splitting a droplet within the EWOD device when the signal generator applies the voltage signals, the sequence of actuation patterns comprising: applying a first actuation pattern including actuated elements at the contact line on opposite sides of the droplet and unactuated elements spaced apart from the contact line, wherein the signal generator generates voltage signals in accordance with the first actuation pattern; applying a second actuation pattern corresponding to the first actuation pattern of actuated and unactuated elements, with the second actuation pattern being shifted one element relative to the first actuation pattern in opposing directions on opposite sides of the contact line, wherein the signal generator generates voltage signals in accordance with the second actuation pattern; applying a third actuation pattern corresponding to the second actuation pattern of actuated and unactuated elements, with the third actuation pattern being shifted one element relative to the second actuation pattern in opposing directions on opposite sides of the contact line, wherein the signal generator generates voltage signals in accordance with the third actuation pattern; and applying a fourth actuation pattern corresponding to the third actuation pattern of actuated and unactuated elements, with the fourth actuation pattern being shifted one element relative to the third actuation pattern in opposing directions on opposite sides of the contact line, wherein the signal generator generates voltage signals in accordance with the fourth actuation pattern thereby splitting the droplet.

In an exemplary embodiment of the method, the method further includes the step of identifying a droplet position of a liquid droplet on an array of elements of the EWOD device, including determining a contact line constituting a boundary of the liquid droplet.

Another aspect of the invention is a non-transitory computer-readable medium storing program code which is executed by a processing device for controlling actuation voltages applied to array elements of an element array of an electro-wetting on dielectric (EWOD) device for performing droplet manipulations on droplets on the element array. The program code is executable by the processing device to perform the steps of the control method.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

INDUSTRIAL APPLICABILITY

The present invention finds application as a method of actuating droplets within a microfluidic device. More specifically, the present invention find application as a method for actuating droplets within an active matrix electro wetting on dielectric (AM-EWOD) digital microfluidic device. Such devices may be used to perform chemical or biological reactions, tests or the like. Applications may include health-care diagnostic testing, material testing, chemical or biochemical material synthesis, proteomics, tools for research in life sciences and forensic science.

What is claimed is:

1. A microfluidic system comprising:
    an electrowetting on dielectric (EWOD) device comprising an array of elements that are actuatable for manipulation of a liquid droplet within the EWOD device;
    a pattern generator that is configured to generate an actuation pattern for actuating a portion of the elements in the array of elements; and
    a signal generator that generates voltage signals for actuating elements in the array of elements in accordance with the actuation pattern;
    wherein the pattern generator is configured to generate an actuation pattern in a region of the array of elements containing the liquid droplet, the actuation pattern including a first voltage signal that is applied to elements in a part of the region at or adjacent to a contact line of the liquid droplet with the array of elements, and a second voltage signal is applied to elements in a part of the region that is adjacent to an interior of the liquid droplet and not at or adjacent to the contact line, and that the first and second voltage signals are different.

2. The microfluidic system of claim 1, wherein the pattern generator is configured to generate an actuation pattern in which elements in at least part of the region at or adjacent to the contact line are actuated and elements that are not in the part of the region at or adjacent to the contact line are unactuated.

3. The microfluidic system of claim 1, wherein the pattern generator is configured to generate an actuation pattern in which elements around the entire contact line are actuated, and elements spaced apart from the contact line are unactuated.

4. The microfluidic system of claim 1, wherein a proportion of the elements spaced apart from the contact line that are unactuated is 50% or greater relative to the actuated elements.

5. The microfluidic system of claim 1, wherein the pattern generator is configured to generate a sequence of actuation patterns to perform a droplet manipulation operation for a droplet within the EWOD device when the signal generator applies the voltage signals.

6. The microfluidic system of claim 5, wherein the pattern generator is configured to generate a sequence of actuation patterns to perform a droplet manipulation operation for moving a droplet within the EWOD device when the signal generator applies the voltage signals, the sequence of actuation patterns comprising:
    applying a first actuation pattern including actuated elements at the contact line and unactuated elements spaced apart from the contact line, wherein the signal generator generates voltage signals in accordance with the first actuation pattern; and
    applying a second actuation pattern corresponding to the first actuation pattern of actuated and unactuated elements, with the second actuation pattern being shifted one element relative to the first actuation pattern, wherein the signal generator generates voltage signals in accordance with the second actuation pattern.

7. The microfluidic system of claim 6, wherein the first actuation pattern includes actuated elements that include less than all the elements at the contact line.

8. The microfluidic system of claim 5, wherein the pattern generator is configured to generate a sequence of actuation patterns to perform a droplet manipulation operation for splitting a droplet within the EWOD device when the signal generator applies the voltage signals, the sequence of actuation patterns comprising:

applying a first actuation pattern including actuated elements at the contact line on opposite sides of the droplet and unactuated elements spaced apart from the contact line, wherein the signal generator generates voltage signals in accordance with the first actuation pattern; and applying subsequent actuation patterns corresponding to the first actuation pattern of actuated and unactuated elements, with the subsequent actuation patterns being sequentially shifted relative to the first actuation pattern in opposing directions on opposite sides of the contact line, wherein the signal generator generates voltage signals in accordance with the subsequent actuation patterns thereby splitting the droplet.

9. The microfluidic system of claim 8, wherein the pattern generator is configured to generate the sequence of actuation patterns to perform a droplet manipulation operation for splitting a droplet within the EWOD device, the sequence of actuation patterns comprising:

applying a first actuation pattern including actuated elements at the contact line on opposite sides of the droplet and unactuated elements spaced apart from the contact line, wherein the signal generator generates voltage signals in accordance with the first actuation pattern;

applying a second actuation pattern corresponding to the first actuation pattern of actuated and unactuated elements, with the second actuation pattern being shifted one element relative to the first actuation pattern in opposing directions on opposite sides of the contact line, wherein the signal generator generates voltage signals in accordance with the second actuation pattern;

applying a third actuation pattern corresponding to the second actuation pattern of actuated and unactuated elements, with the third actuation pattern being shifted one element relative to the second actuation pattern in opposing directions on opposite sides of the contact line, wherein the signal generator generates voltage signals in accordance with the third actuation pattern; and applying a fourth actuation pattern corresponding to the third actuation pattern of actuated and unactuated elements, with the fourth actuation pattern being shifted one element relative to the third actuation pattern in opposing directions on opposite sides of the contact line, wherein the signal generator generates voltage signals in accordance with the fourth actuation pattern thereby splitting the droplet.

10. The microfluidic system of claim 1, wherein the pattern generator is configured to generate an actuation pattern in which voltage signals that are applied to a portion of the elements that are not in the part of the region at or adjacent to the contact line include a balancing voltage that is less than an actuation voltage for actuating the actuated elements.

11. The microfluidic system of claim 1, wherein the pattern generator is configured to generate an actuation pattern in which elements in the at least part of the region at or adjacent to the contact line are unactuated and elements that are not in the part of the region at or adjacent to the contact line are actuated.

12. The microfluidic system of claim 1, wherein the array of elements includes a set of element electrodes patterned in individual electrode elements to which the signal generator applies the voltage signals, and the array of elements includes a first substrate on which the set of element electrodes is deposited.

13. The microfluidic system of claim 1, further comprising a droplet position detector that tracks a position of the droplet within the EWOD device for determining the contact line constituting a boundary of the liquid droplet.

14. The microfluidic system of claim 1, wherein the pattern generator is configured to generate an actuation pattern comprising fewer than all array elements at or adjacent to the contact line.

15. The microfluidic system of claim 14, wherein the actuation pattern comprises actuated array elements in which no two actuated array elements are adjacent elements to each other.

16. The microfluidic system of claim 14, wherein the actuation pattern comprises a first portion of actuated array elements at or adjacent to the contact line and a second portion of array elements at or adjacent to the contact line, and the first portion and the second portion are separated from each other by at least one array element that is at or adjacent to the contact line contact line.

17. The microfluidic system of claim 14, wherein the actuation pattern comprises actuated array elements that are less than half of the array elements at or adjacent to the contact line contact line.

18. A method of performing a droplet manipulation in a microfluid system including an electrowetting on dielectric (EWOD) device having an array of elements that are actuatable for manipulation of a liquid droplet within the EWOD device, the method comprising the steps of:

generating an actuation pattern for actuating a portion of the elements in the array of elements; and applying voltage signals to actuate elements in the array of elements in accordance with the actuation pattern;

wherein the actuation pattern includes voltage signals applied in a region of the array of elements containing the liquid droplet, the actuation pattern including a first voltage signal that is applied to elements in a part of the region at or adjacent to a contact line of the liquid droplet with the array of elements, and a second voltage signal is applied to elements in a part of the region that is adjacent to an interior of the liquid droplet and not at or adjacent to the contact line, and that the first and second voltage signals are different.

19. The method of claim 18, wherein generating the actuation pattern comprises generating a sequence of actuation patterns to perform a droplet manipulation operation for moving a droplet within the EWOD device when the signal generator applies the voltage signals, the sequence of actuation patterns comprising:

applying a first actuation pattern including actuated elements at the contact line and unactuated elements spaced apart from the contact line, wherein the signal generator generates voltage signals in accordance with the first actuation pattern; and applying a second actuation pattern corresponding to the first actuation pattern of actuated and unactuated elements, with the second actuation pattern being shifted one element relative to the first actuation pattern, wherein the signal generator generates voltage signals in accordance with the second actuation pattern.

20. The method of claim 18, wherein generating the actuation pattern comprises generating a sequence of actuation patterns to perform a droplet manipulation operation for splitting a droplet within the EWOD device when the signal generator applies the voltage signals, the sequence of actuation patterns comprising:

applying a first actuation pattern including actuated elements at the contact line on opposite sides of the droplet and unactuated elements spaced apart from the contact line, wherein the signal generator generates voltage signals in accordance with the first actuation pattern; and applying subsequent actuation patterns corresponding to the first actuation pattern of actuated and unactuated elements, with the subsequent actuation patterns being sequentially shifted relative to the first actuation pattern in opposing directions on opposite sides of the contact line, wherein the signal generator generates voltage signals in accordance with the subsequent actuation patterns thereby splitting the droplet.

21. The method of claim 19, wherein generating the actuation pattern comprises generating a sequence of actuation patterns to perform a droplet manipulation operation for splitting a droplet within the EWOD device when the signal generator applies the voltage signals, the sequence of actuation patterns comprising:

applying a first actuation pattern including actuated elements at the contact line on opposite sides of the droplet and unactuated elements spaced apart from the contact line, wherein the signal generator generates voltage signals in accordance with the first actuation pattern;

applying a second actuation pattern corresponding to the first actuation pattern of actuated and unactuated elements, with the second actuation pattern being shifted one element relative to the first actuation pattern in opposing directions on opposite sides of the contact line, wherein the signal generator generates voltage signals in accordance with the second actuation pattern;

applying a third actuation pattern corresponding to the second actuation pattern of actuated and unactuated elements, with the third actuation pattern being shifted one element relative to the second actuation pattern in opposing directions on opposite sides of the contact line, wherein the signal generator generates voltage signals in accordance with the third actuation pattern; and applying a fourth actuation pattern corresponding to the third actuation pattern of actuated and unactuated elements, with the fourth actuation pattern being shifted one element relative to the third actuation pattern in opposing directions on opposite sides of the contact line, wherein the signal generator generates voltage signals in accordance with the fourth actuation pattern thereby splitting the droplet.

22. The method of claim 18, further comprising identifying a droplet position of a liquid droplet on an array of elements of the EWOD device, including determining a contact line constituting a boundary of the liquid droplet.

23. A non-transitory computer-readable medium storing program code which is executed a processing device for controlling actuation voltages applied to array elements of an element array of an electro-wetting on dielectric (EWOD) device for performing droplet manipulations on droplets on the element array, the program code being executable by the processing device to perform the steps of:

generating an actuation pattern for actuating a portion of the elements in the array of elements; and applying voltage signals to actuate elements in the array of elements in accordance with the actuation pattern;

wherein the actuation pattern includes voltage signals applied in a region of the array of elements containing the liquid droplet, the actuation pattern including a first voltage signal that is applied to elements in a part of the region at or adjacent to a contact line of the liquid droplet with the array of elements, and a second voltage signal is applied to elements in a part of the region that is adjacent to an interior of the liquid droplet and not at or adjacent to the contact line, and that the first and second voltage signals are different.

24. The non-transitory computer-readable medium of claim 23, wherein the program code is executable by the processing device further to perform the step of identifying a droplet position of a liquid droplet on an array of elements of the EWOD device, including determining a contact line constituting a boundary of the liquid droplet.

* * * * *

UNITED STATES PATENT AND TRADEMARK OFFICE
CERTIFICATE OF CORRECTION

PATENT NO. : 10,330,920 B2  
APPLICATION NO. : 15/478752  
DATED : June 25, 2019  
INVENTOR(S) : Christopher James Brown et al.

Page 1 of 1

It is certified that error appears in the above-identified patent and that said Letters Patent is hereby corrected as shown below:

On the Title Page

Item (72) "Inventors" should read:  
Christopher James Brown, Oxford (GB); Benjamin James Hadwen, Oxford (GB); Pamela Ann Dothie, Oxford (GB); Gregory Gay, Oxford (GB)

Signed and Sealed this  
Eighth Day of October, 2019

Andrei Iancu  
*Director of the United States Patent and Trademark Office*